(12) United States Patent
Nakagawa et al.

(10) Patent No.: US 10,449,446 B2
(45) Date of Patent: Oct. 22, 2019

(54) SENSATION INDUCTION DEVICE, SENSATION INDUCTION SYSTEM, AND SENSATION INDUCTION METHOD

(71) Applicant: SONY CORPORATION, Tokyo (JP)

(72) Inventors: Yusuke Nakagawa, Tokyo (JP); Akihiro Komori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 320 days.

(21) Appl. No.: 15/126,636

(22) PCT Filed: Dec. 16, 2014

(86) PCT No.: PCT/JP2014/083271
§ 371 (c)(1),
(2) Date: Sep. 16, 2016

(87) PCT Pub. No.: WO2015/145893
PCT Pub. Date: Oct. 1, 2015

(65) Prior Publication Data
US 2017/0087458 A1   Mar. 30, 2017

(30) Foreign Application Priority Data

Mar. 26, 2014  (JP) .................. 2014-063908

(51) Int. Cl.
| | | |
|---|---|---|
| *A63F 13/285* | (2014.01) | |
| *A63F 13/25* | (2014.01) | |
| *A63F 13/54* | (2014.01) | |
| *G06F 3/16* | (2006.01) | |
| *G06F 3/0346* | (2013.01) | |
| *G06F 3/01* | (2006.01) | |

(52) U.S. Cl.
CPC ............ *A63F 13/285* (2014.09); *A63F 13/25* (2014.09); *A63F 13/54* (2014.09); *G06F 3/016* (2013.01); *G06F 3/0346* (2013.01); *G06F 3/165* (2013.01)

(58) Field of Classification Search
CPC ...... A63F 13/285; G06F 3/016; G06F 3/1279; G06K 9/00711
See application file for complete search history.

(56) References Cited

U.S. PATENT DOCUMENTS

2010/0160016 A1*  6/2010  Shimabukuro ..... G07F 17/3209
463/16

FOREIGN PATENT DOCUMENTS

| JP | HEI 11-114223 A | 4/1999 |
|---|---|---|
| JP | 2003-199974 A | 7/2003 |
| JP | 2003-210834 A | 7/2003 |
| JP | 2009-011758 A | 1/2009 |
| JP | 2009-072600 A | 4/2009 |
| JP | 2010-082396 A | 4/2010 |
| JP | 2013-008118 A | 1/2013 |

* cited by examiner

*Primary Examiner* — Robert T Clarke, Jr.
(74) *Attorney, Agent, or Firm* — Chip Law Group

(57) ABSTRACT

A sensation induction device includes a plurality of actuators and a plurality of speakers. The sensation induction device includes a plurality of sets of mutually associated actuator and speaker in which at least one actuator among the plurality of actuators and at least one speaker among the plurality of speakers are mutually associated. An output from the actuator and an output from the speaker are controlled to be interlocked for each set of mutually associated actuator and speaker.

18 Claims, 21 Drawing Sheets

FIG. 1
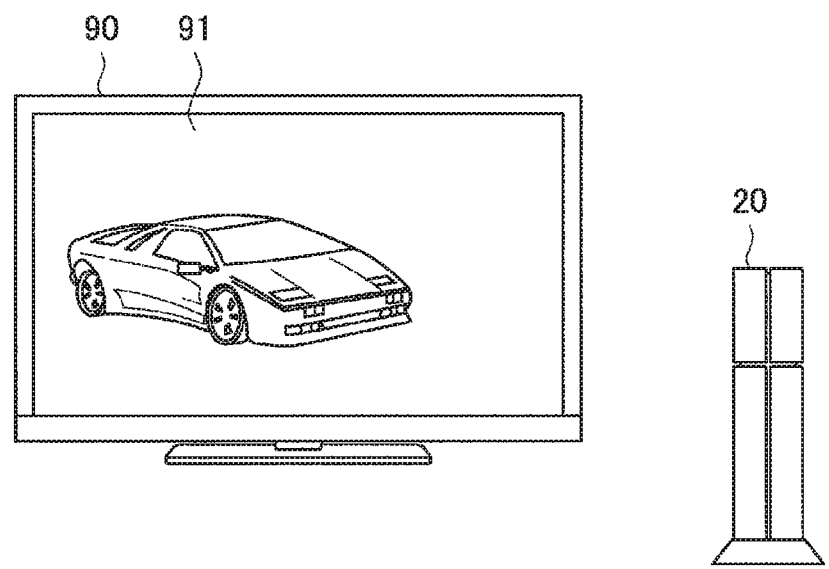
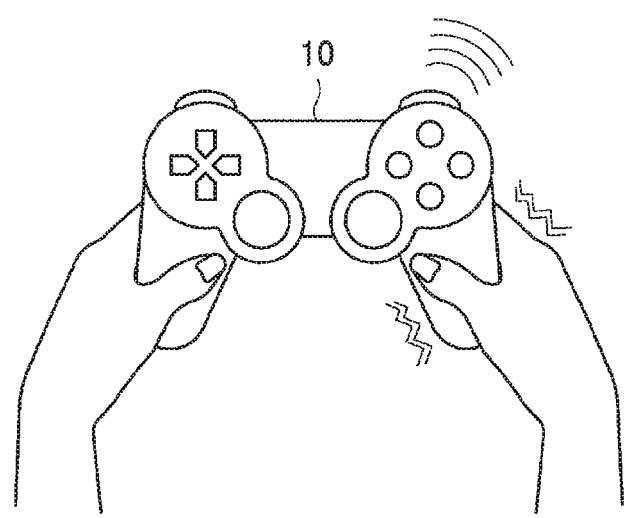

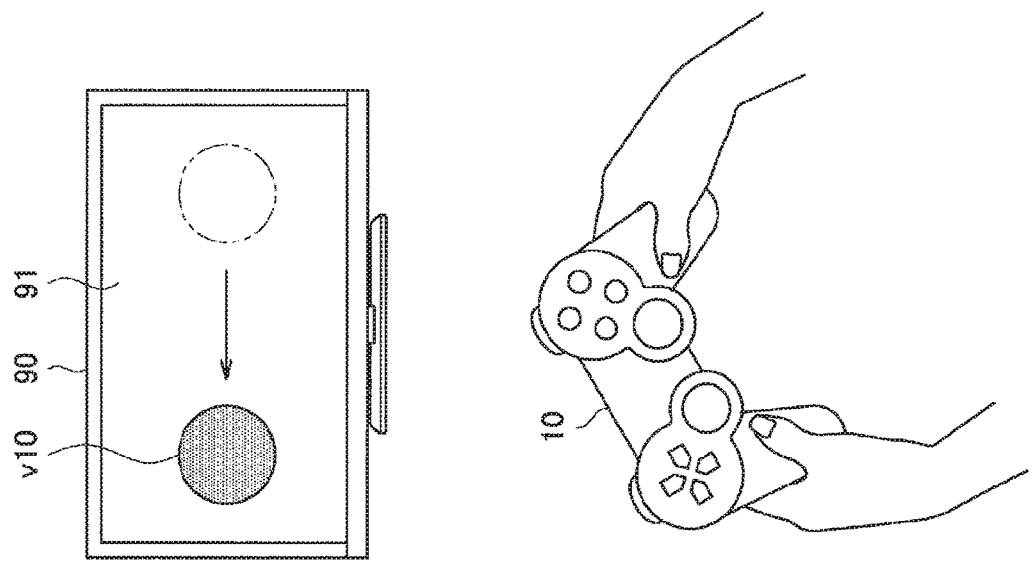
FIG. 5
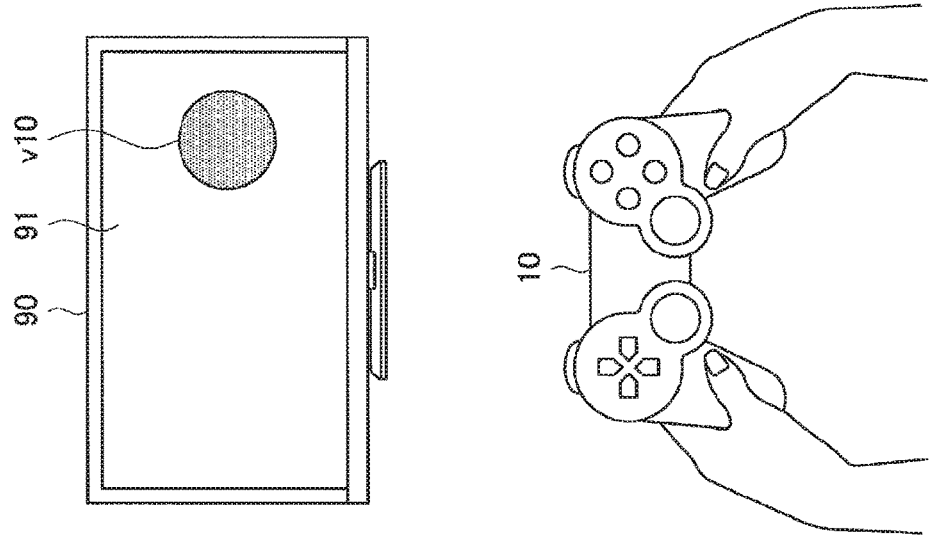

FIG. 6
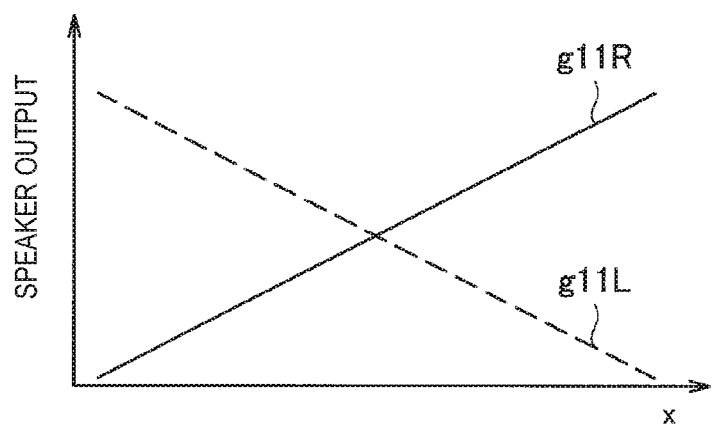
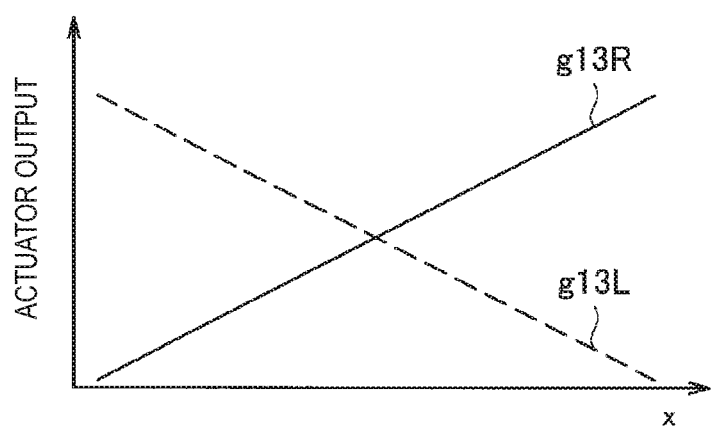

FIG. 7
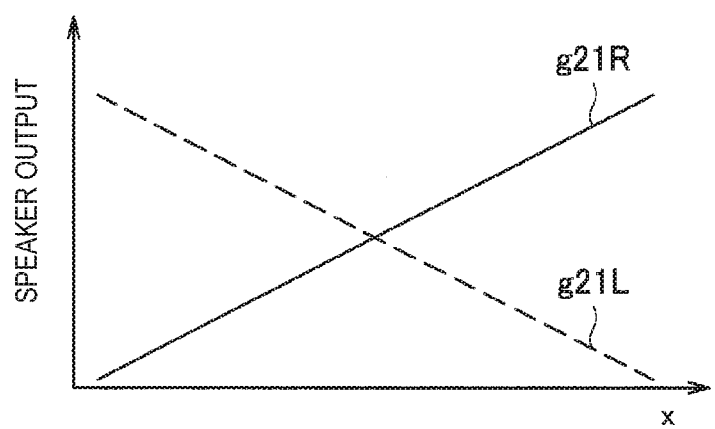
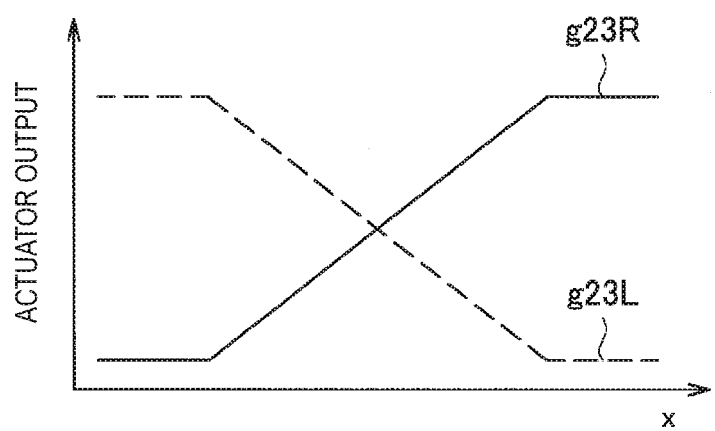

FIG. 14
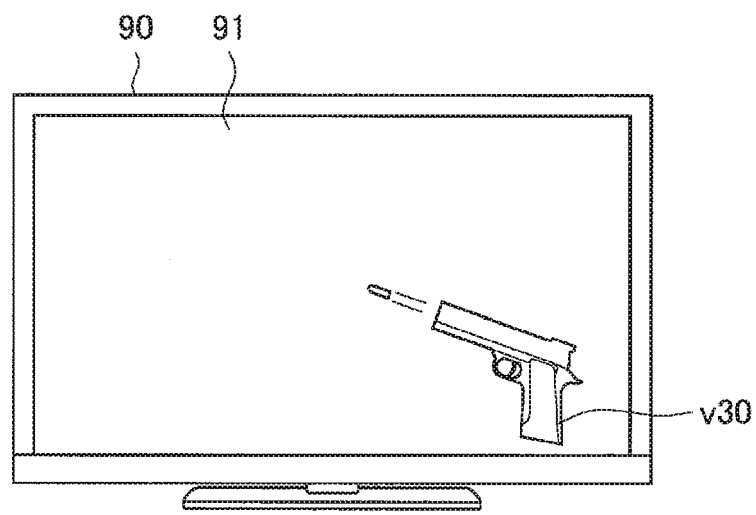
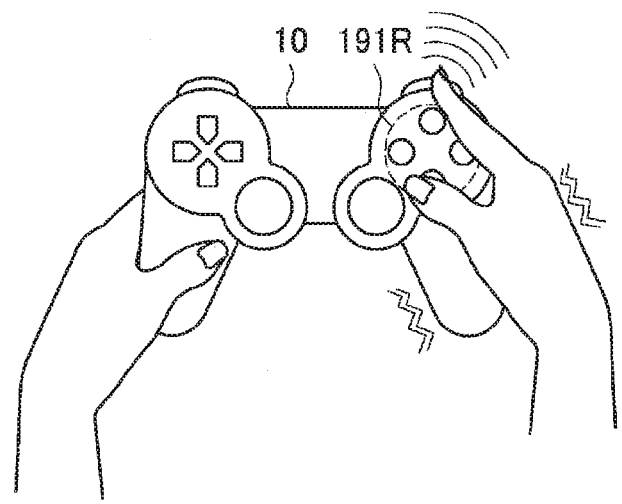

FIG. 18
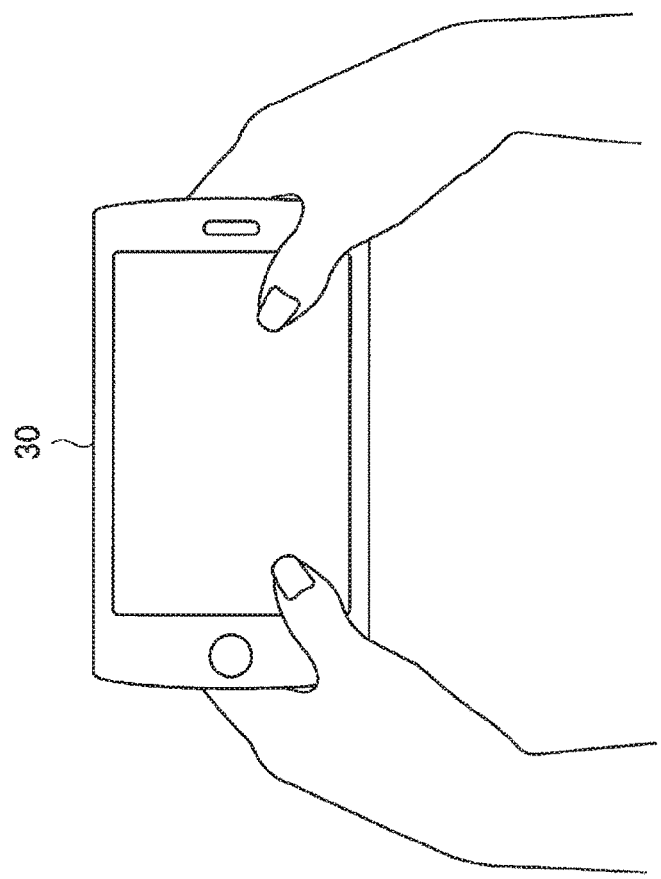
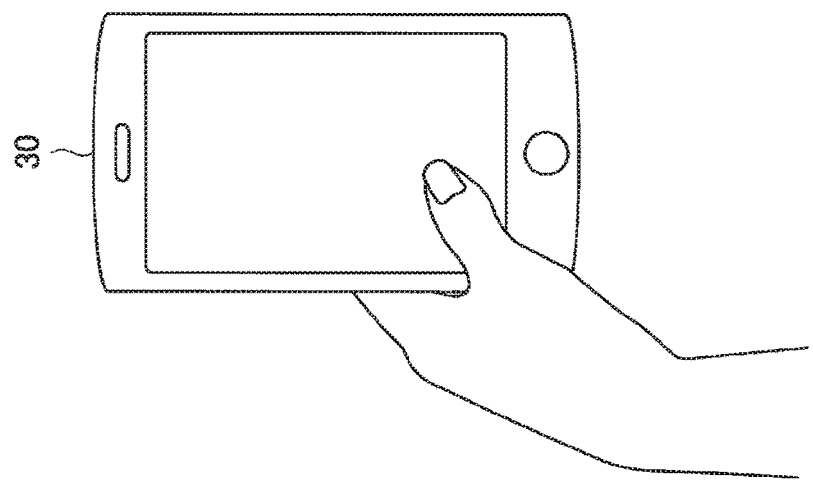

SENSATION INDUCTION DEVICE, SENSATION INDUCTION SYSTEM, AND SENSATION INDUCTION METHOD

CROSS REFERENCE TO RELATED APPLICATIONS

This application is a U.S. National Phase of International Patent Application No. PCT/JP2014/083271 filed on Dec. 16, 2014, which claims priority benefit of Japanese Patent Application No. JP 2014-063908 filed in the Japan Patent Office on Mar. 26, 2014. Each of the above-referenced applications is hereby incorporated herein by reference in its entirety.

TECHNICAL FIELD

The present disclosure relates to a sensation induction device, a sensation induction system, and a sensation induction method.

BACKGROUND ART

There are technologies for feeding sensations back to users to heighten a sense of realism by including speakers or actuators in various digital devices and presenting pseudo-tactile senses or kinesthetic senses (hereinafter generally referred to as "tactile senses" in some cases) by sound outputs from the speakers or vibration of the actuators.

As specific examples of devices feeding sensations back to users, controllers used in information processing devices such as game consoles can be exemplified. For example, by driving actuators in the controllers based on details of a manipulation of the users on the controllers, it is possible to present a sense of realism or a sense of immersion to the users as if the users were actually manipulating the objects in games. Hereinafter, devices feeding sensations back to users are referred to as "sensation induction devices" in some cases.

CITATION LIST

Patent Literature

Patent Literature 1: JP 2009-72600A

SUMMARY OF INVENTION

Technical Problem

On the other hand, as technologies for feeding sensations back to users, technologies capable of heightening the sense of realism by feeding more intuitive sensations back by interlocking vibration outputs and sound outputs related to presentation of tactile senses are necessary.

Accordingly, it is desirable to provide a novel and improved sensation induction device, a novel and improved sensation induction system, and a novel and improved sensation induction method capable of improving a sense of realism by interlocking a sound output and a vibration output.

Solution to Problem

According to the present disclosure, there is provided a sensation induction device including: a plurality of actuators; and a plurality of speakers. The sensation induction device includes a plurality of sets in which at least one actuator among the plurality of actuators and at least one speaker among the plurality of speakers are mutually associated. An output from the actuator and an output from the speaker are controlled to be interlocked for each set of mutually associated actuator and speaker.

According to the present disclosure, there is provided a sensation induction system including: a sensation induction device that includes a plurality of actuators and a plurality of speakers and includes a plurality of sets in which at least one actuator among the plurality of actuators and at least one speaker among the plurality of speakers are mutually associated; an information processing device configured to output a control signal for controlling an operation of the sensation induction device; and a control unit configured to perform control such that an output from the actuator and an output from the speaker are interlocked for each set of mutually associated actuator and speaker based on the control signal.

According to the present disclosure, there is provided a control device including: a signal processing unit configured to generate a control signal for performing control such that, in a sensation induction device that includes a plurality of actuators and a plurality of speakers and includes a plurality of sets in which at least one actuator among the plurality of actuators and at least one speaker among the plurality of speakers are mutually associated, an output from the actuator and an output from the speaker are interlocked for each set of mutually associated actuator and speaker; and an output unit configured to output the generated control signal to the sensation induction device.

According to the present disclosure, there is provided a sensation induction method including: outputting a control signal for performing control of an operation of a sensation induction device that includes a plurality of actuators and a plurality of speakers and includes a plurality of sets in which at least one actuator among the plurality of actuators and at least one speaker among the plurality of speakers are mutually associated; and performing control based on the control signal such that an output from the actuator and an output from the speaker are interlocked for each set of mutually associated actuator and speaker.

Advantageous Effects of Invention

According to the present disclosure described above, it is possible to provide the sensation induction device, the sensation induction system, and the sensation induction method capable of improving a sense of realism by interlocking a sound output and a vibration output.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is an explanatory diagram illustrating an example of a schematic system configuration of a sensation induction system according to an embodiment of the present disclosure.

FIG. 5 is an explanatory diagram illustrating an example of control of interlocking of each speaker and each actuator of the sensation induction device according to the embodiment.

FIG. 6 is an explanatory diagram illustrating an example of control of a sound output from each speaker and a vibration output from each actuator of the sensation induction device.

FIG. 7 is an explanatory diagram illustrating an example of control of a sound output from each speaker and a vibration output from each actuator of the sensation induction device.

FIG. 14 is an explanatory diagram illustrating an example when control is performed such that orientation of a user manipulation, a video, a sound output, and tactile sense feedback is coordinated.

FIG. 18 is an explanatory diagram illustrating an overview of a sensation induction device according to Example 3.

DESCRIPTION OF EMBODIMENT(S)

Figure 2:
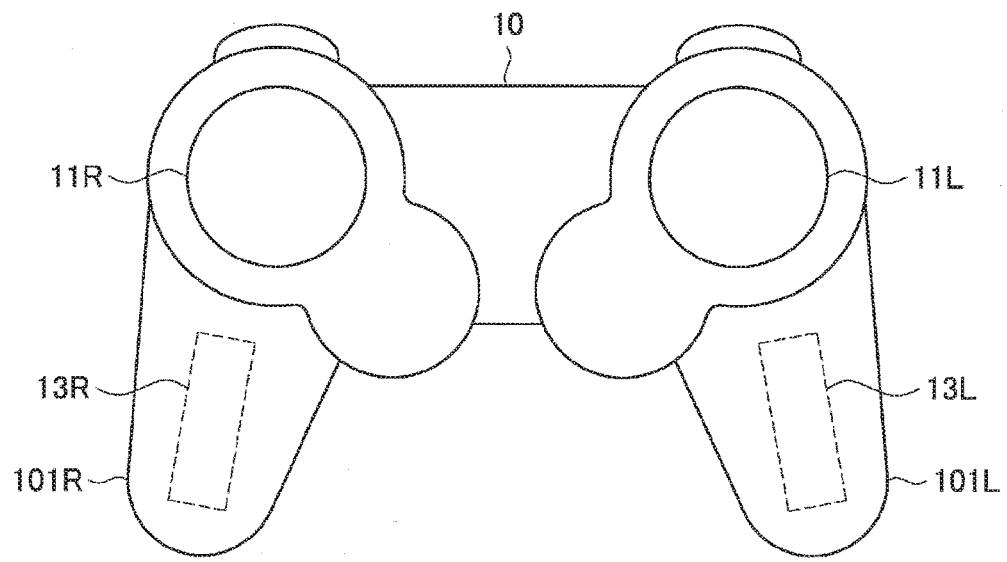
FIG. 2 is an explanatory diagram illustrating a schematic configuration of a sensation induction device according to the embodiment.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be made in the following order.
1. Embodiment
1.1. Schematic configuration
1.2. Control of outputs from speaker and actuator
1.3. Hardware configuration
1.4. Functional configuration
1.5. Process
2. Examples
2.1. Example 1: first configuration example of actuators and speakers
2.2. Example 2: second configuration example of actuators and speakers
2.3. Example 3: example of application to portable terminal
2.4. Example 4: example of sensation induction device
2.5. Example 5: example of application to controller
3. Conclusion

1. EMBODIMENT

1.1. Schematic Configuration

First, an overview of a sensation induction system according to an embodiment of the present disclosure will be described with reference to FIG. 1. FIG. 1 is an explanatory diagram illustrating an example of a schematic system configuration of the sensation induction system according to an embodiment of the present disclosure.

As illustrated in FIG. 1, the sensation induction system according to the embodiment of the present disclosure includes, for example, a sensation induction device 10, a control device 20, and a display device 90.

For example, FIG. 1 illustrates an example of a case in which the control device 20 is configured as a device (for example, a game console) that plays back a video game or a video work and the sensation induction device 10 is configured as a control device (hereinafter referred to as a "controller" in some cases) for manipulating the device.

The sensation induction device 10 includes an input device such as a button which is used for the user to perform a manipulation (for example, an input manipulation for a game which is currently active) on a game console. The sensation induction device 10 may include a kind of sensor, such as an acceleration sensor or a gyro sensor (angular velocity sensor), that detects a change in movement or a direction of the casing of the sensation induction device 10. By installing such a sensor in the sensation induction device 10, the user can perform a manipulation on the control device 20 (for example, a game console) by performing an action of moving the casing of the sensation induction device 10. The above-described method and configuration in which the user performs a manipulation through the sensation induction device 10 are merely examples and are not limited to the foregoing examples. For example, a touch panel or an analog stick may be installed as an input device in the sensation induction device 10. A configuration in which movement of a user is sensed by an imaging device such as a camera and the sensed movement of the user is recognized as details of a manipulation may be applied.

The sensation induction device 10 according to the embodiment includes a speaker and an actuator, so that a pseudo-tactile sense can be fed back to a user by a sound output from the speaker and vibration of the actuator.

For example, in the case of the example illustrated in FIG. 1, the control device 20 controls an operation of an object displayed on a display unit 91 of the display device 90 based on a user input from the sensation induction device 10 configured as a controller. At this time, the control device 20 feeds a tactile sense according to the operation of the object back to the user by outputting a sound from the speaker of the sensation induction device 10 based on an operation of an object and vibrating the actuator of the sensation induction device 10. In such a configuration, the sensation induction system illustrated in FIG. 1 can supply the user with a sense of manipulation in which the sense of realism is high. Hereinafter, vibration of an actuator is referred to as a "vibration output" and a pseudo-tactile sense presented (fed back) to the user through the vibration output is referred to as "tactile sense feedback" in some cases.

Here, an example of the configuration of the sensation induction device 10 according to the embodiment will be described with reference to FIG. 2. FIG. 2 is an explanatory diagram illustrating a schematic configuration of the sensation induction device 10 according to the embodiment. FIG. 2 illustrates the configuration of the sensation induction device 10 when the sensation induction device 10 is held by the user and is viewed from the opposite side to the user (that is, the configuration of the sensation induction device 10 on the rear side). Specifically, when the user holds the sensation induction device 10 and faces the front surface of the sensation induction device 10, that is, the surface on which an input device such as a button is installed, the left side of the drawing corresponds to the right side (R) when viewed by the user and the right side of the drawing corresponds to the left side (L) when viewed by the user. Hereinafter, the case in which the user holds the sensation induction device 10 and faces the front surface of the sensation induction device 10 is referred to as a "case in which the user faces the sensation induction device 10" in some cases.

As illustrated in FIG. 2, speakers 11R and 11L are installed on the rear surface of the casing of the sensation induction device 10. Specifically, when the user faces the sensation induction device 10, the speaker 11R is installed on the right rear surface of the casing of the sensation induction device 10 and the speaker 11L is installed on the left rear surface of the casing of the sensation induction device 10.

The speaker 11R is a speaker that outputs a sound mainly toward the right ear of the user. Similarly, the speaker 11L is a speaker that outputs a sound mainly toward the left ear of the user. Hereinafter, when the speakers 11R and 11L are not particularly distinguished from each other, the speakers 11R and 11L are simply referred to as the "speakers 11" in some cases.

The sensation induction device 10 according to the embodiment includes holding units 101R and 101L which are used for the user to hold the casing near both ends of the casing which are located on mutually opposite sides. In the example illustrated in FIG. 2, when the user faces the sensation induction device 10, the holding unit 101R is installed on the right side of the casing of the sensation induction device 10 and corresponds to a portion at which the user holds the casing of the sensation induction device 10 with his or her right hand. Similarly, the holding unit 101L is installed on the left side of the casing of the sensation induction device 10 and corresponds to a portion at which the user holds the casing of the sensation induction device 10 with his or her left hand.

Inside the holding unit 101R, an actuator 13R that vibrates based on a supplied control signal is contained. Similarly, inside the holding unit 101L, an actuator 13L is contained. Hereinafter, when the actuators 13R and 13L are not particularly distinguished from each other, the actuators 13R and 13L are simply referred to as the "actuators 13" in some cases.

Figure 3:
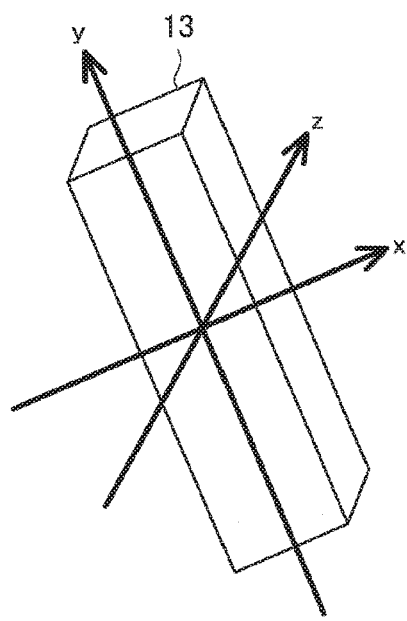
FIG. 3 is a diagram for describing an example of an actuator.
Figure 13:
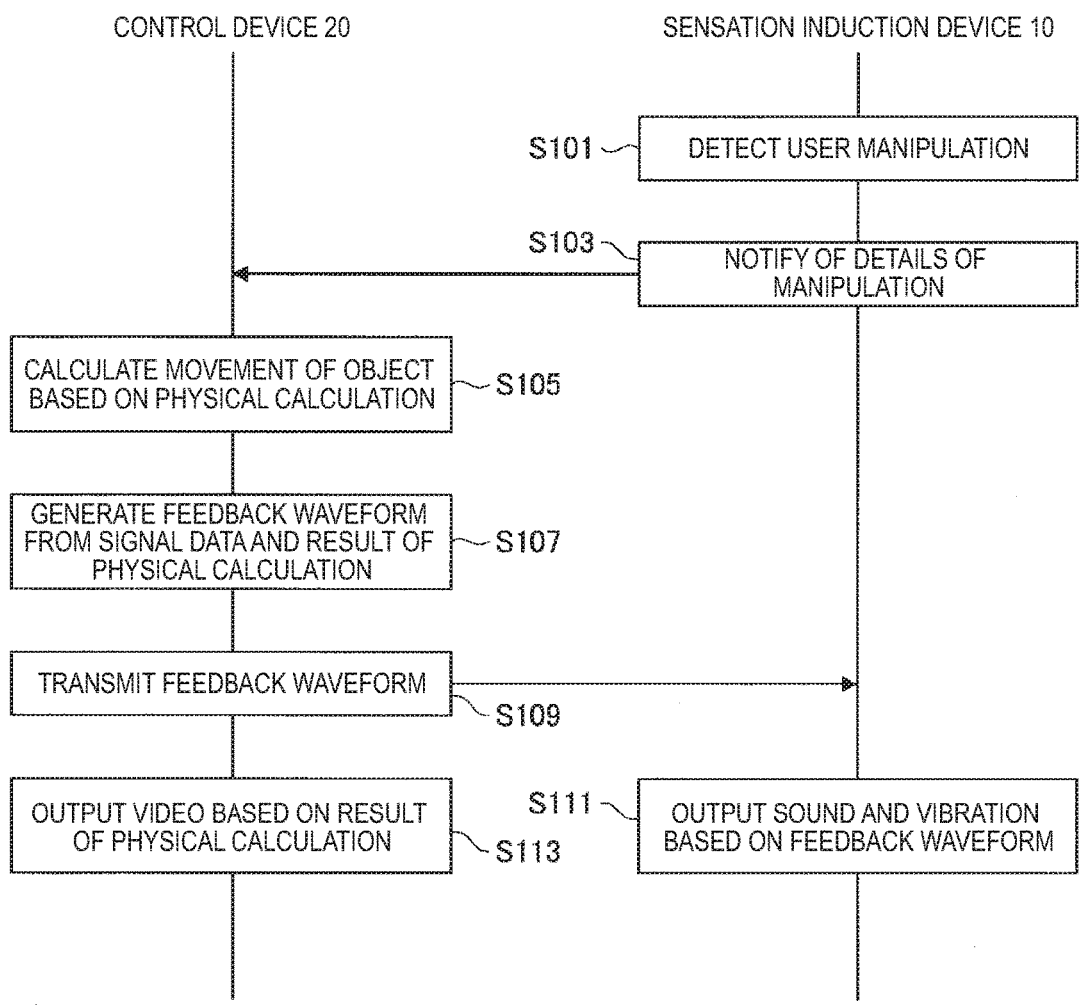
FIG. 13 is a diagram illustrating an example of the flow of a series of operations of the sensation induction system according to the embodiment.

FIG. 3 is a diagram for describing an example of the actuator 13. For example, FIG. 13 illustrates an example of the actuator configured to be able to vibrate in directions along the x axis, the y axis, and the z axis perpendicular to each other (hereinafter referred to as an "x direction," a "y direction," and a "z direction" in some cases). When the actuator that vibrates in a plurality of mutually different directions is applied in this way and an amplitude or a phase of vibration in each direction in which the actuator vibrates is adjusted, the sensation induction device 10 can feed various tactile senses backs to the user.

As illustrated in FIG. 2, the sensation induction device 10 according to the embodiment includes the plurality of actuators 13 (for example, the actuators 13R and 13L). Therefore, the sensation induction device 10 adjusts the amplitude or the phase of vibration of each of the plurality of actuators to present various tactile senses to the user. As a specific example, the sensation induction device 10 enables a kinesthetic sense presented to the user to have directivity by biasing the amplitude of vibration between the actuators 13R and 13L illustrated in FIG. 3.

The sensation induction device 10 may perform control by providing a time difference between outputs of vibration of the plurality of actuators. As a specific example, the sensation induction device 10 enables a kinesthetic sense presented to the user to have directivity by displacing output timings (in other words, phases) of vibration between the actuators 13R and 13L illustrated in FIG. 3. Of course, it is needless to say that the sensation induction device 10 may combine the control of the amplitudes of the actuators (for example, control of gains or volumes) and the control of the output timings of the vibration of the actuators.

Figure 4:
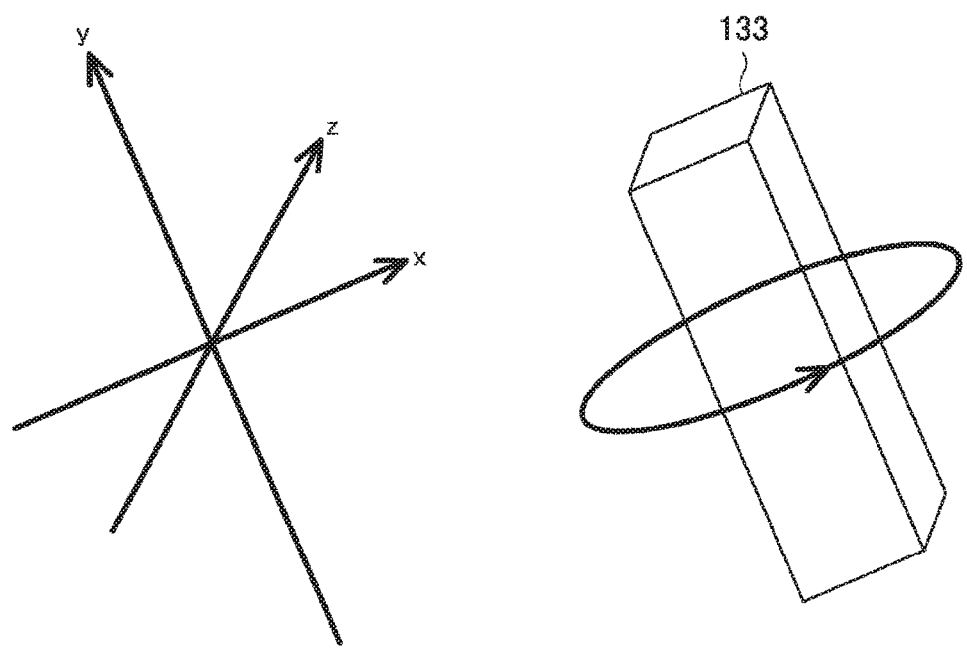
FIG. 4 is a diagram for describing an example of an actuator.

The actuator 13 illustrated in FIG. 3 is merely an example and the configuration of the actuator 13 is not limited to the example illustrated in FIG. 3. For example, the actuator 13 may be configured to vibrate only in one direction. A direction in which the actuator 13 vibrates is not necessarily limited to a straight direction. For example, FIG. 4 is a diagram for describing another example of the actuator 13. As illustrated in FIG. 4, the actuator 13 may be configured to vibrate in a circular direction in a predetermined plane (in the case illustrated in FIG. 4, a circular direction in the xz plane). Of course, it is needless to say that the same vibration as the actuator 13 illustrated in FIG. 4 may be reproduced by adjusting the amplitude and the phase of vibration of the actuator 13 illustrated in FIG. 3 in the x and y directions.

Next, an overview of control of a sound output from each speaker and a vibration output from each actuator in the sensation induction device 10 according to the embodiment will be described.

In the sensation induction device 10 according to the embodiment, presentation of a tactile sense is realized so that a sense of realism is higher by coordinating orientation of a sound output from each speaker and orientation of tactile sense feedback based on vibration of each actuator. Specifically, the sensation induction device 10 is configured to include a plurality of sets in which at least one actuator among the plurality of actuators and at least one speaker among the plurality of speakers are mutually associated. For each set of mutually associated actuator and speaker, the sound output from each speaker and the vibration output from each actuator of the sensation induction device 10 are controlled to be interlocked.

For example, in the case of the example illustrated in FIG. 2, the speaker 11R located on the right side (R) of the sensation induction device 10 and the actuator 13R installed inside the holding unit 101R held by the right hand of the user are associated in advance. The sound output from the speaker 11R and the vibration output from the actuator 13R are controlled to be mutually interlocked.

As a specific example, when the control is performed such that the amplitude of the sound output from the speaker 11R is increased, the control is performed such that the amplitude of the vibration output from the actuator 13R associated with the speaker 11R is also increased.

Control entities of the sound output from the speaker 11 and the vibration output from the actuator 13 are not particularly limited. For example, the sensation induction device 10 may perform control such that the sound output from the speaker 11 and the vibration output from the actuator 13 are interlocked. As another example, the control device 20 may perform control such that the sound output from the speaker 11 and the vibration output from the actuator 13 are interlocked. The details of the control regarding the interlocking of the speaker 11 and the actuator 13 will be described separately later. The control device 20 corresponds to an example of an "information processing device" that outputs a control signal for controlling an operation of the sensation induction device.

Similarly, the speaker 11L located on the left side (L) of the sensation induction device 10 and the actuator 13L installed inside the holding unit 101L held by the left hand of the user are associated in advance. The sound output from the speaker 11L and the vibration output from the actuator 13L are controlled to be mutually interlocked.

In such a configuration, orientation of the tactile sense feedback based on the sound output from the speaker 11 and the vibration output from the actuator 13 of the sensation induction device 10 is coordinated in the sensation induction system according to the embodiment. Specifically, when sounds are output from the speakers 11R and 11L, a tactile sense is fed back to the user by vibrating the actuators 13R and 13L as in the sound output. At this time, for example, a ratio between the amplitudes of the tactile sense feedback by the actuators 13R and 13L is adjusted in accordance with a ratio of the amplitudes of the sound outputs from the speakers 11R and 11L (that is, a ratio between the amplitudes of the sound outputs on the right and left side). Such control can lead to considerable improvement in the sense of realism of the tactile sense feedback through the sensation induction device 10 in the sensation induction system according to the embodiment.

1.2. Control of Outputs from Speaker and Actuator

Next, a case in which the sensation induction device 10 has the configuration illustrated in FIG. 2 in the example of the control in which each speaker 11 and each actuator 13 of the sensation induction device 10 are interlocked in the sensation induction system according to the embodiment will be described as an example with reference to FIGS. 5 and 6. FIG. 5 is an explanatory diagram illustrating an example of the control of the interlocking of each speaker 11 and each actuator 13 of the sensation induction device 10 according to the embodiment. FIG. 5 illustrates an example of a manipulation image when the sensation induction device 10 is configured as a controller of a game console and the like.

For example, FIG. 5 illustrates a manipulation image when the user manipulates an object v10 displayed on the display unit 91 of the display device 90 to the right and left by tilting the sensation induction device 10 to the right and left. Specifically, when the user tilts the sensation induction device 10 to the left, the control device 20 (not illustrated) controls display of the display device 90 such that the object v10 displayed on the display unit 91 is moved to the left.

At this time, based on an instruction from the control device 20, the amplitudes of the sound outputs from the speakers 11R and 11L and the amplitudes of the vibration outputs (that is, tactile sense feedback) from the actuators 13R and 13L of the sensation induction device 10 are controlled in accordance with an operation of the object v10 on the display unit 91. For example, FIG. 6 is an explanatory diagram illustrating an example of control of the sound output from each speaker 11 and the vibration output from each actuator 13 of the sensation induction device 10.

In graphs g11R and g11L illustrated on the upper side of FIG. 6, an example of a relation between the sound outputs from the speakers 11R and 11L and the position of the object v10 displayed on the display unit 91 in the horizontal direction of the display unit 91 is illustrated. The vertical axis represents speaker outputs, that is, the amplitudes (relative values) of the sound outputs from the speakers 11R and 11L. The horizontal axis represents the coordinate x of the object v10 on the display unit 91 in the horizontal direction. The right side of the graph corresponds to the right side of the display unit 91 and the left side of the graph corresponds to the left side of the display unit 91. The graph g11R is a graph that indicates a relation between the amplitude of the sound output from the speaker 11R and the coordinate x of the object v10 on the display unit 91 in the horizontal direction. Similarly, the graph g11L is a graph that indicates a relation between the amplitude of the sound output from the speaker 11L and the coordinate x of the object v10 on the display unit 91 in the horizontal direction.

In graphs g13R and g13L illustrated on the lower side of FIG. 6, an example of a relation between the vibration outputs from the actuators 13R and 13L and the position of the object v10 displayed on the display unit 91 in the horizontal direction of the display unit 91 is illustrated. The vertical axis represents actuator outputs, that is, the amplitudes (relative values) of the vibration outputs from the actuators 13R and 13L. The horizontal axis is the same as in the graphs regarding the sound outputs from the speakers 11R and 11L illustrated on the upper side of FIG. 6. The graph g13R is a graph that indicates a relation between the amplitude of the vibration output from the actuator 13R and the coordinate x of the object v10 on the display unit 91 in the horizontal direction. Similarly, the graph g13L is a graph that indicates a relation between the amplitude of the vibration output from the actuator 13L and the coordinate x of the object v10 on the display unit 91 in the horizontal direction.

In the example illustrated in FIG. 6, when the object v10 is moved from the left side to the right side on the display unit 91, as illustrated in the graph g11R, the amplitude of the sound output from the speaker 11R is controlled to be increased linearly. At this time, the amplitude of the vibration output from the actuator 13R is controlled to be interlocked with the amplitude (the graph g11R) of the sound output from the speaker 11R and thus increased linearly, as illustrated in the graph g13R.

When the object v10 is moved from the left side to the right side on the display unit 91, as illustrated in the graph g11L, the amplitude of the sound output from the speaker 11L is controlled to be decreased linearly. At this time, the amplitude of the vibration output from the actuator 13L is controlled to be interlocked with the amplitude (the graph g11L) of the sound output from the speaker 11L and thus decreased linearly, as illustrated in the graph g13L.

In FIG. 6, the example in which the vibration outputs from the actuators 13 are controlled to be interlocked with the sound outputs of the speakers 11 and thus changed linearly has been described. However, the outputs may not necessarily be controlled to be changed linearly when the sound outputs and the vibration outputs are interlocked.

For example, FIG. 7 is an explanatory diagram illustrating another example of the control of the sound output from each speaker 11 and the vibration output from each actuator 13 of the sensation induction device 10. Graphs g21R and g21L illustrated on the upper side of FIG. 7 correspond to the sound outputs from the speakers 11R and 11L, as in the graphs g11R and g11L illustrated on the upper side of FIG. 6. Therefore, the vertical and horizontal axes of the graphs G21R and 21L are the same as in the graphs g11R and g11L illustrated on the upper side of FIG. 6. Graphs g23R and g23L illustrated on the lower side of FIG. 7 correspond to the vibration outputs from the actuators 13R and 13L, as in the graphs g13R and g13L illustrated on the lower side of FIG. 6. Therefore, the vertical and horizontal axes of the graphs g23R and g23L are the same as in the graphs g13R and g13L illustrated on the lower side of FIG. 6.

In the example illustrated in FIG. 7, when the object v10 is moved from the left side to the right side on the display unit 91, as illustrated in the graph g21R, the amplitude of the sound output from the speaker 11R is controlled to be increased linearly. Conversely, as illustrated in the graph g23R, the amplitude of the vibration output from the actuator 13R is interlocked with the amplitude (the graph g21R) of the sound output from the speaker 11R, and thus increased, but the amplitude of the vibration output is controlled to be changed nonlinearly. As a specific example, as illustrated in the graph g23R, when the object v10 is moved to the right side over a predetermined coordinate on the left side on the display unit 91, the amplitude of the vibration output from the actuator 13R is controlled to be increased.

When the object v10 is moved from the left side to the right side on the display unit 91, as illustrated in the graph g21L, the amplitude of the sound output from the speaker 11L is controlled to be increased linearly. Conversely, as illustrated in the graph g23L, the amplitude of the vibration output from the actuator 13L is interlocked with the amplitude (the graph g11L) of the sound output from the speaker 11L, and thus decreased, but the amplitude of the vibration output is controlled to be changed nonlinearly. As a specific example, as illustrated in the graph g23L, when the object v10 is moved to the right side over a predetermined coordinate on the left side on the display unit 91, the amplitude of the vibration output from the actuator 13L is controlled to be decreased.

The controls described above with reference to FIGS. 6 and 7 are merely examples. The control method is not particularly limited as long as the outputs of the speaker 11 and the actuator 13 (for example, the speaker 11R and the actuator 13R, or the speaker 11L and the actuator 13L) associated in advance are controlled to be interlocked.

In this way, in the sensation induction system according to the embodiment, the speakers 11 and the actuators 13 of the sensation induction device 10 are associated, and the plurality of sets of mutually associated speakers 11 and actuators 13 are provided. In the sensation induction system according to the embodiment, the outputs (that is, the sound output and the vibration output) from the mutually associated speaker 11 and actuator 13 are interlocked. Such a configuration and control can lead to considerable improvement in the sense of realism of the tactile sense feedback by coordinating the orientation of the sound output from the speaker 11 and the orientation of the tactile sense feedback based on the vibration output from the actuator 13 in the sensation induction system according to the embodiment.

1.3. Hardware Configuration

Figure 8:
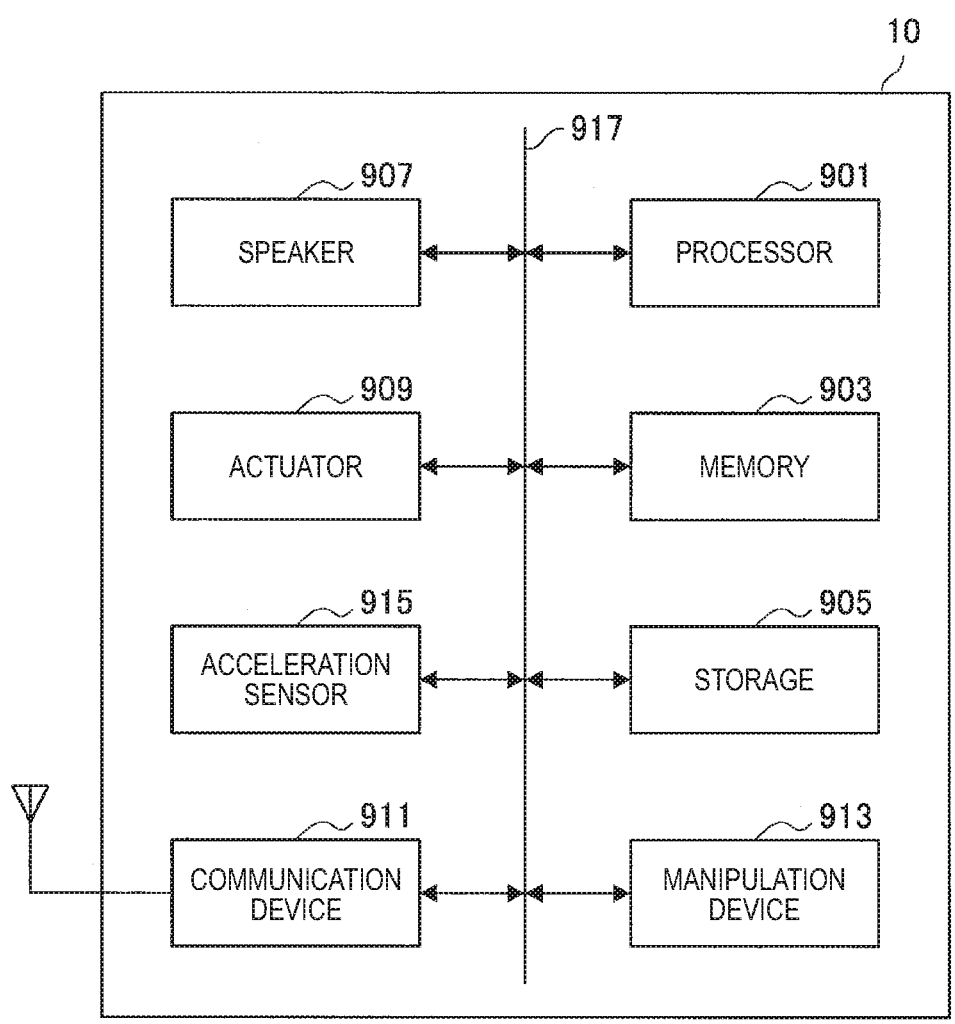
FIG. 8 is a diagram illustrating an example of a hardware configuration of the sensation induction device according to the embodiment.

Next, an example of a hardware configuration of the sensation induction device 10 according to the embodiment will be described with reference to FIG. 8. FIG. 8 is a diagram illustrating an example of the hardware configuration of the sensation induction device 10 according to the embodiment.

As illustrated in FIG. 8, for example, the sensation induction device 10 according to the embodiment includes a processor 901, a memory 903, a storage 905, speakers 907, actuators 909, a communication device 911, a manipulation device 913, and an acceleration sensor 915.

The processor 901 may be, for example, a central processing unit (CPU), a graphics processing unit (GPU), a digital signal processor (DSP), or a system on chip (SoC) and performs various processes of the sensation induction device 10. For example, the processor 901 can be configured of an electronic circuit that performs various calculation processes. The memory 903 includes a random access memory (RAM) and a read-only memory (ROM) and stores data and programs which are executed by the processor 901. The storage 905 can include a storage medium such as a semiconductor memory or a hard disk.

The speaker 907 is an output device that outputs a sound signal. The sensation induction device 10 according to the embodiment includes the plurality of speakers 907. The speakers 907 correspond to the speakers 11R and 11L illustrated in FIG. 2.

The actuator 909 is a device that vibrates in accordance with an input control signal to feed a pseudo-tactile sense back to a user. The sensation induction device 10 according to the embodiment includes the plurality of actuators 909. Each actuator 909 is associated with any one of the plurality of speakers 907. The actuators 909 correspond to the actuators 13R and 13L illustrated in FIG. 2.

The communication device 911 is a communication unit that is included in the sensation induction device 10 and communicates with an external device (for example, the control device 20 illustrated in FIG. 1) via a network. The communication device 911 can be configured as an interface for wireless or wired communication. When the communication device 911 is configured as an interface for wireless communication, the communication device 911 may include a communication antenna, a radio frequency (RF) circuit, and a baseband processor. As a specific example, the communication device 911 may be a communication device capable of establishing wireless communication with one or more external devices present in a predetermined communication area such as Bluetooth (registered trademark).

The communication device 911 has a function of performing various kinds of signal processing on a signal received from an external device and can supply a digital signal generated from the received analog signal to the processor 901.

The manipulation device 913 has a function of generating an input signal used for the user to perform a desired manipulation. The manipulation device 913 may be configured to include an input device, such as a button or a switch, that is used for the user to input information and an input control circuit that generates an input signal based on an input by the user and supplies the input signal to the processor 901.

The acceleration sensor 915 is a sensor that detects acceleration as a voltage value. The acceleration sensor 915 may be a tri-axial acceleration sensor that detects acceleration along the X axis, acceleration along the Y axis, and acceleration along the Z axis. The acceleration sensor 915 can supply detected acceleration data to the processor 901.

A gyro sensor may be installed in place of the acceleration sensor 915 or both of the acceleration sensor 915 and the gyro sensor may be installed. The gyro sensor is a kind of measurer that detects an angle or acceleration of an object. The gyro sensor may be a tri-axial gyro sensor that detects velocities (angular velocities) at which angles of rotation around the X, Y, and Z axes are changed as voltage values. The gyro sensor can supply detected angular velocity data to the processor 901.

The bus 917 mutually connects the processor 901, the memory 903, the storage 905, the speakers 907, the actuators 909, the communication device 911, the manipulation device 913, and the acceleration sensor 915. The bus 917 may include a plurality of kinds of buses.

1.4. Functional Configuration

Figure 9:
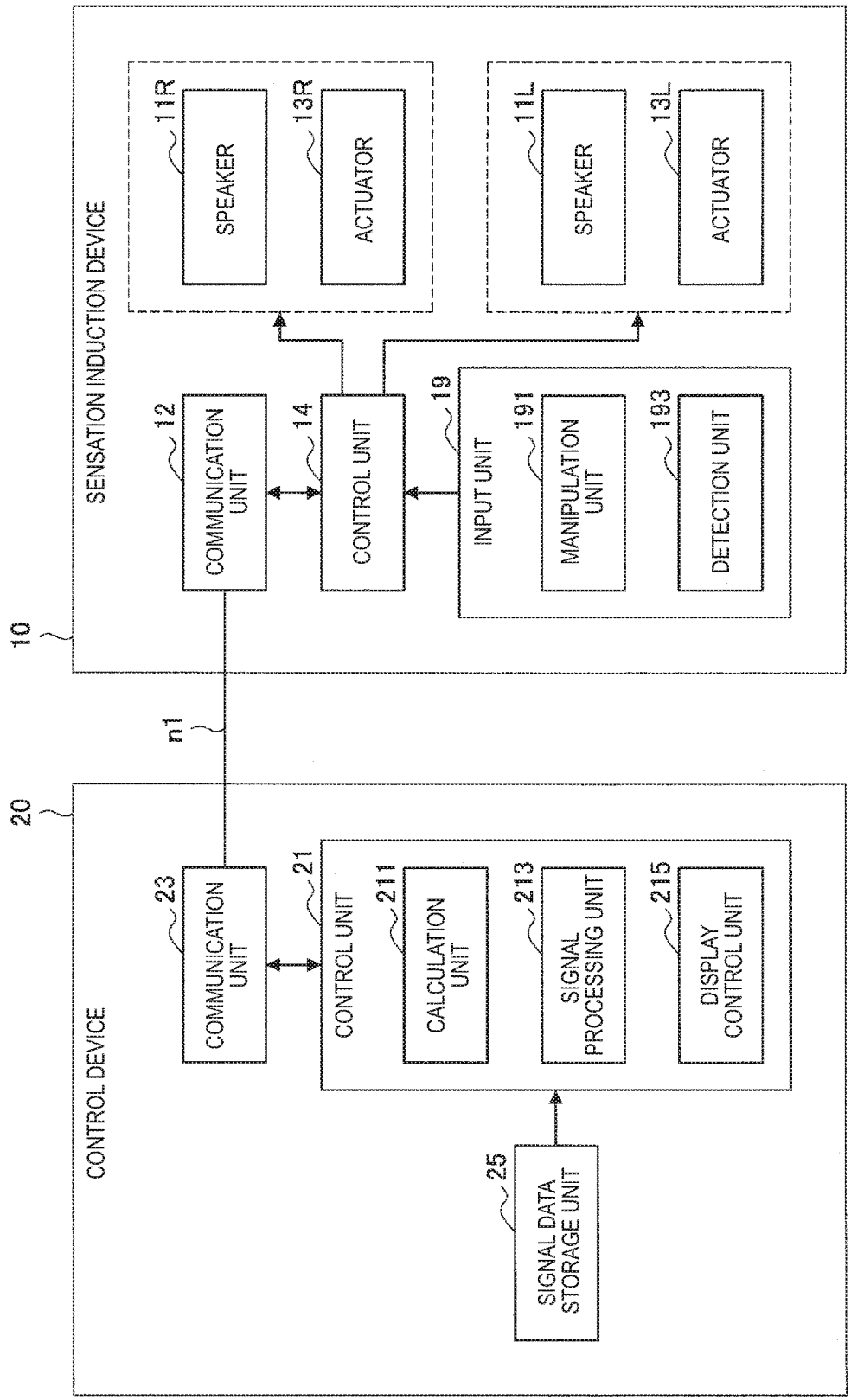
FIG. 9 is a block diagram illustrating an example of a functional configuration of the sensation induction system according to the embodiment.

Next, an example of a functional configuration of the sensation induction system according to the embodiment will be described with reference to FIG. 9, particularly focusing on the sensation induction device 10 and the control device 20. FIG. 9 is a block diagram illustrating an example of a functional configuration of the sensation induction system according to the embodiment.

First, description will focus on the control device 20. As illustrated in FIG. 9, the control device 20 includes a control unit 21, a communication unit 23, and a signal data storage unit 25. The control unit 21 includes a calculation unit 211, a signal processing unit 213, and a display control unit 215.

The communication unit 23 is a communication interface which is used for each constituent of the control device 20 to communicate with the sensation induction device 10 or the display device 90 (not illustrated) via a network n1. The network n1 is, for example, a wireless or wired transmission path connecting other devices. When the network n1 is configured as a wireless transmission path, a wireless communication network based on the Bluetooth (registered trademark) standard can be exemplified as a specific example. Hereinafter, when data is transmitted and received between each constituent of the control device 20 and the sensation induction device 10 or the display device 90, the data is assumed to be transmitted and received via the communication unit 23 unless otherwise specified.

The communication unit 23 may be configured to be able to communicate with an external server via a communication path such as the Internet. In this case, the communication unit 23 may be, for example, a device that establishes communication via a communication path such as the Internet. Hereinafter, to facilitate the description, the communication unit 23 is assumed to be able to communicate with each of the sensation induction device 10, the display device 90, and the external server for description, but the present disclosure is not necessarily limited to this configuration. For example, a communication interface that performs communication with some of the sensation induction device 10, the display device 90, and the external server and a communication interface that performs communication with the remaining devices may be installed as different devices.

The control unit 21 performs various kinds of control to acquire a series of content such as a video game or a video work and present a video, a sound, and a tactile sense to the user via the sensation induction device 10 or the display device 90 based on video data, sound data, and tactile sense data included in the content. A content acquisition sources is not particularly limited. For example, the control unit 21 may acquire content stored in a storage unit (not illustrated) in the control device 20 or may acquire content from the outside via a network such as the Internet.

Hereinafter, a case in which the user manipulates the object v10 displayed on the display unit 91 of the display device 90 through the sensation induction device 10 configured as a controller, as illustrated in FIG. 5, in each constituent of the control unit 21 will be described as an example.

The calculation unit 211 acquires a control signal indicating details of a manipulation performed on the sensation induction device 10 by the user from the sensation induction device 10 via the network n1. The calculation unit 211 specifies the details of the manipulation performed by the user, that is, a manipulation direction or a manipulation amount based on the acquired control signal and calculates movement of the object v10 based on physical calculation in which the specified details of the manipulation are used as an input.

As a specific example, the calculation unit 211 may specify a direction of a force acting on the object v10 based on the manipulation direction and may specify the magnitude of the force acting on the object v10 based on the manipulation amount. Accordingly, for example, when the weight of the object v10 or the gravitational force acting on the object v10 is set virtually, the calculation unit 211 can calculate a motion direction or a motion speed of the object v10 (in addition to a temporal operation of the object v10) by the magnitude or the direction of the force acting on the object v10 and calculated based on a user manipulation.

The present disclosure is not limited to the example in which the object v10 moves based on the user manipulation as described above, but the calculation unit 211 may simulate operations of various objects based on physical calculation. As a specific example, the calculation unit 211 may calculate a motion direction or a motion speed of a certain object by analyzing a video which is played back as content in which the object is moving.

The details of the physical calculation are not necessarily limited to a motion of an object. For example, the calculation unit 211 may calculate at least one of the shape or roughness of the surface of a certain object by analyzing a video of the object played back as content and calculate a frictional force generated with the surface of the object based on the calculated shape or roughness of the surface of the object. For example, a feeling of the user touching the object with his or her hand can be reproduced simulatively as tactile sense feedback from the frictional force calculated in this way.

The calculation unit 211 notifies the signal processing unit 213 and the display control unit 215 of a result of the physical calculation, for example, information indicating the calculated motion direction or motion speed of the object v10.

The display control unit 215 displays a video included in the acquired content on the display unit 91 of the display device 90. Accordingly, for example, as illustrated in FIG. 5, the object v10 is displayed on the display unit 91 of the display device 90.

The display control unit 215 acquires the result of the physical calculation, for example, the information indicating the motion direction or the motion speed of the object v10 from the calculation unit 211. Based on the acquired motion direction or motion speed of the object v10, the display control unit 215 calculates a display position or a display form (for example, a change in the shape) of the object v10. Based on the calculated display position or display form of the object v10, the display control unit 215 causes the display device 90 to update the video of the object v10 displayed on the display unit 91.

Based on the result of the physical calculation by the calculation unit 211, the signal processing unit 213 performs signal processing on sound signals output from the speakers 11R and 11R of the sensation induction device 10. Based on the result of the physical calculation, the signal processing unit 213 generates a control signal to vibrate the actuators 13R and 13L.

For example, the signal processing unit 213 may read the sound signals output from the speakers 11R and 11L from the played-back content and control the amplitudes of the sound signals according to the motion direction or the motion speed of the object v10, as described above with reference to FIG. 6 or 7.

The signal processing unit 213 reads tactile sense data (for example, a vibration signal indicating vibration) for reproducing a tactile sense from the played-back content and generates control signals for driving the actuators 13R and 13L. As a specific example, the signal processing unit 213 may generate the control signal for driving the actuator 13R by processing or controlling the vibration signal read from the content so that the vibration output from the actuator 13R is interlocked with the sound output from the speaker 11R. Similarly, the signal processing unit 213 may generate the control signal for driving the actuator 13L by processing or controlling the vibration signal read from the content so that the vibration output from the actuator 13L is interlocked with the sound output from the speaker 11L. Based on the foregoing control, the signal processing unit 213 generates the control signals for driving the actuators 13R and 13L.

When the signal processing unit 213 generates the control signals for driving the actuators 13R and 13L, the signal processing unit 213 may generate the control signals, for example, by processing a standard signal stored in the signal data storage unit 25.

The standard signal stored in the signal data storage unit 25 is, for example, a signal which serves as a generation source of the control signals for driving the actuators 13 to realize various kinds of tactile sense feedback. The signal data storage unit 25 stores, for example, a standard signal generated in advance for each classification of tactile sense feedback to be reproduced. The signal processing unit 213 reads the standard signal corresponding to the tactile sense feedback (for example, tactile sense feedback indicated by the tactile sense data included in the content) to be reproduced from the signal data storage unit 25 and generates the control signals for driving the actuators 13 by adjusting the amplitude or the phase of the read standard signal. The standard signal or signals (for example, sound signals or vibration signals) indicated by the sound data and the tactile sense data included in the content correspond to an example of a "control signal for controlling an operation of the sensation induction device."

Depending on content to be played back, the tactile sense data for reproducing the tactile sense may not necessarily be included. Therefore, the signal processing unit 213 may generate control signals for driving the actuators 13 so that tactile sense feedback is reproduced in a simulative manner on the basis of sound data or the sound signal which is based on sound data and the tactile sense feedback is presented.

As a specific example, the signal processing unit 213 may extract a signal (vibration signal) with a low-frequency band (for example, a band equal to or less than 1000 Hz) of the sound signal by applying a lowpass filter to the sound signal and reproduce the tactile sense feedback on the basis of the extracted signal with the low-frequency band in a simulative manner. Through such a process, for example, vibration with gentle temporal variation can be reproduced. The signal processing unit 213 may extract a signal with a high-frequency band (for example, a band equal to or greater than 300 Hz) of the sound signal by applying a highpass filter to the sound signal and set the extracted signal with the high-frequency band as a sound signal to be output.

The signal processing unit 213 may detect a rising of the signal by analyzing the extracted signal with the low-frequency band and reproduce the tactile sense feedback in a simulative manner on the basis of the signal including a short pulse indicating the rising. Through such a process, for example, sharply varying vibration as in a shock at the time of a collision can be reproduced.

When the tactile sense feedback is reproduced in the simulative manner from the sound signal, it is needless to say that the signal processing unit 213 may further perform signal processing on the extracted signal (for example, the signal with the low-frequency band). As a specific example of the signal processing, one of application of various filters (lowpass filters, highpass filters, or bandpass filters) and application of a process such as pitch shift, or a plurality of combinations thereof can be exemplified.

The signal processing unit 213 may generate the control signal for driving the actuator 13L in accordance with dimension of the vibration direction of the actuator 13 of the sensation induction device 10 connected to the control device 20 in a wireless or wired manner.

As a specific example, the tactile sense data for reproducing the tactile sense included in the content is generated assuming the actuator 13 vibrating in the x, y, and z directions, as illustrated in FIG. 3. On the other hand, the actuator 13 of the sensation induction device 10 is configured to be able to vibrate only in one direction among the x, y, and z directions in some cases. In such cases, for example, the signal processing unit 213 may acquire information regarding the actuator 13 (that is, information regarding a direction in which the actuator can vibrate) in advance from the sensation induction device 10 and generate the control signal in accordance with the dimension of the vibration direction of the actuator 13 based on the information.

For example, the actuator 13 of the sensation induction device 10 is assumed to be configured such that the actuator can vibrate only in the x direction. In this case, the signal processing unit 213 may generate the control signal to reproduce only the vibration in the x direction among the x, y, and z directions indicated by the tactile sense data included in the content.

As another example, the signal processing unit 213 may decide the amplitude of the vibration of the actuator 13 of the sensation induction device 10 through vector calculation based on vibration components in the x, y, and z directions indicated by the tactile sense data included in the content. As a specific example, the amplitudes of the vibration components in the x, y, and z directions indicated by the tactile sense data included in the content are denoted by Vx, Vy, and Vz. In this case, for example, the signal processing unit 213 may decide an amplitude V of the vibration of the actuator 13 of the sensation induction device 10 based on Formula 1 expressed below.

[Math. 1]

$$V=\sqrt{Vx^2+Vy^2+Vz^2}$$  Formula 1

The foregoing calculation is merely an example and the method of calculating the amplitude of the vibration of the actuator 13 is not particularly limited as long as the dimension of the vibration direction indicated by the tactile data included in the content is greater than the dimension of the direction in which the actuator 13 of the sensation induction device 10 can vibrate. For example, the signal processing unit 213 may decide the amplitude of the vibration of the actuator 13 of the sensation induction device 10 based on an average of the amplitudes of the vibration components in the x, y, and z directions indicated by the tactile data.

In this way, the signal processing unit 213 generates the control signals for driving the actuators 13R and 13L by performing the signal processing on the sound signals output from the speakers 11R and 11L. At this time, the control signal for driving the actuator 13R is generated so that the sound output from the speaker 11R is interlocked with the vibration output from the actuator 13R. At this time, the signal processing unit 213 may control the amplitude or the phase of the sound signal output from the speaker 11R. Similarly, the control signal for driving the actuator 13L is generated so that the sound output from the speaker 11L is interlocked with the vibration output from the actuator 13L. It is needless to say that the signal processing unit 213 may control the amplitude or the phase of the sound signal output from the speaker 11L.

The signal processing unit 213 transmits the sound signals output from the speakers 11R and 11L and the control signals for driving the actuators 13R and 13L to the sensation induction device 10. Accordingly, the sound outputs from the speakers 11R and 11L and the vibration outputs from the actuators 13R and 13L of the sensation induction device 10 are controlled. In the signal processing unit 213, a portion outputting the sound signals and the control signals to the sensation induction device 10 corresponds to an example of an "output unit."

Next, the sensation induction device 10 will be focused on. As illustrated in FIG. 9, the sensation induction device 10 includes the speakers 11R and 11L, the actuators 13R and 13L, a control unit 14, a communication unit 12, and an input unit 19. The speakers 11R and 11L and the actuators 13R and 13L correspond to the speakers 11R and 11L and the actuators 13R and 13L illustrated in FIG. 2, respectively. The input unit 19 includes a manipulation unit 191 and a detection unit 193.

The communication unit 12 is a communication interface which is used for each constituent of the sensation induction device 10 to communicate with the control device 20 via a network n1. For example, the communication unit 12 can be configured of the communication device 911 illustrated in FIG. 8. Hereinafter, when data is transmitted and received between each constituent of the sensation induction device 10 and the control device 20, the data is assumed to be transmitted and received via the communication unit 12 unless otherwise specified.

The manipulation unit 191 is, for example, an input device such as a button or a switch which is used for the user to input information. For example, the manipulation unit 191 can be configured of the manipulation device 913 illustrated in FIG. 8. When a manipulation from the user is received, the manipulation unit 191 notifies the control device 20 of a control signal indicating details of the manipulation via the control unit 14.

The detection unit 193 corresponds to a kind of sensor such as an acceleration sensor or a gyro sensor (angular velocity sensor) that detects a change in movement or a direction of the casing of the sensation induction device 10. For example, the detection unit 193 can be configured of the acceleration sensor 915 illustrated in FIG. 8. When the user manipulates the sensation induction device 10 by moving the casing of the sensation induction device 10, the detection unit 193 notifies the control device 20 of a control signal indicating details of the manipulation (that is, a change in the movement or direction of the casing) via the control unit 14.

When the control signal indicating the details of the manipulation is received from the manipulation unit 191 or the detection unit 193, the control unit 14 notifies the control device 20 of the control signal. Accordingly, the control device 20 can recognize the details of the manipulation performed on the sensation induction device 10 by the user.

The control unit 14 receives the sound signals to be output from the speakers 11R and 11L and the control signals for driving the actuators 13R and 13L from the control device 20.

The control unit 14 outputs the sound signal received from the control device 20 from the speakers 11R and 11L and drives the actuators 13R and 13L based on the received control signals. For example, the control unit 14 can be configured of the processor 901 illustrated in FIG. 8.

The sensation induction system according to the embodiment has been described above particularly focusing on the sensation induction device 10 and the control device 20.

When the sound outputs from the speakers 11R and 11L of the sensation induction device 10 are interlocked with the vibration outputs from the actuators 13R and 13L, the sound outputs and the vibration outputs may not necessarily be interlocked with a video displayed on the display unit 91, as illustrated in FIG. 5.

In the example illustrated in FIG. 9 described above, the example in which the signal processing unit 213 is installed on the side of the control device 20 has been described, but the present disclosure is not necessarily limited to the configuration illustrated in FIG. 9. For example, by installing the signal processing unit 213 on the side of the sensation induction device 10, the signal processing on the sound signals output from the speakers 11R and 11L and the generation of the control signals for driving the actuators 13R and 13L may be executed on the side of the sensation induction device 10.

In this case, for example, the control unit 21 on the side of the control device 20 notifies the side of the sensation induction device 10 of a calculation result by the calculation unit 211. The signal processing unit 213 which is installed on the side of the sensation induction device 10 and is notified of the calculation result may perform the signal processing on the sound signals output from the speakers 11R and 11L and the generation of the control signals for driving the actuators 13R and 13L based on the calculation result that is notified of.

Only some of the processes of the signal processing unit 213 may be performed on the side of the sensation induction device 10. As a specific example, the signal processing on the sound signals output from the speakers 11R and 11L may be performed on the side of the control device 20 and the generation of the control signals for driving the actuators 13R and 13L may be performed on the side of the sensation induction device 10. As another specific example, only control (control of a gain or a volume) of the amplitudes of the sound outputs from the speakers 11R and 11L or control of the amplitudes of the vibration outputs from the actuators 13R and 13L may be performed on the side of the sensation induction device 10.

The signal processing unit 213 according to the embodiment may control the amplitude of at least one output based on the amplitude of the other output in a frequency band in which the outputs from the mutually associated speaker 11 and actuator 13 (that is, the sound output and the vibration output) overlap.

As a specific example, in the frequency band in which the sound output and the vibration output overlap, the user perceives the vibration output as a sound in some cases. Therefore, due to the tactile sense feedback (vibration output) from the actuators 13, the user may feel sounds in the frequency band in which the sound output and the vibration output overlap as if they had an increased output compared to sounds in other frequency bands among sounds output from the speakers 11.

Figure 10:
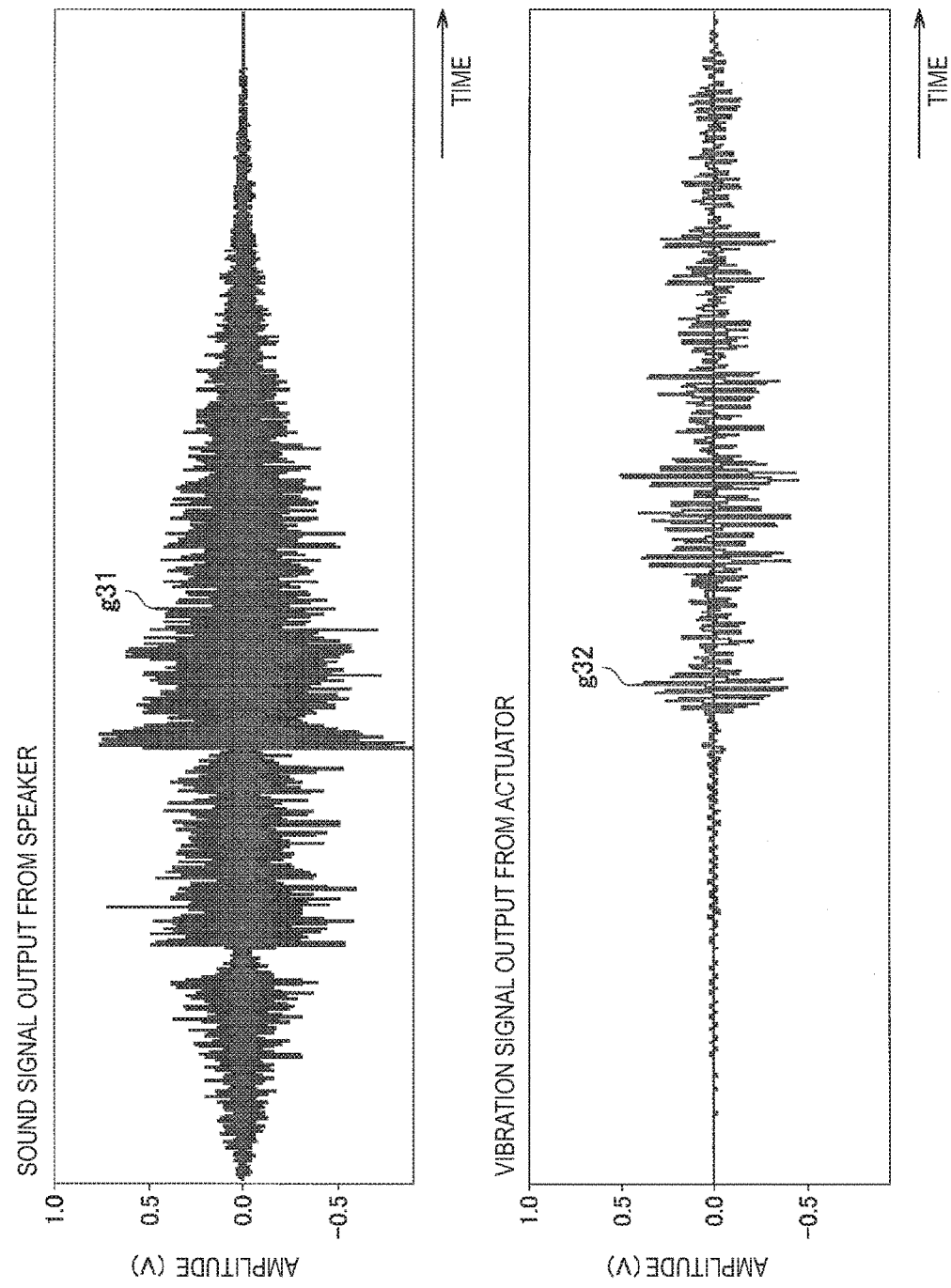
FIG. 10 is a diagram illustrating an example of the waveform of a signal output from each of the speaker and the actuator which are mutually associated.

For example, FIG. 10 illustrates an example of the waveforms of signals output from the mutually related speaker 11 and actuator 13 (that is, a sound signal and a vibration signal). In signal waveforms g31 and g32 illustrated on the upper and lower sides of FIG. 10, the vertical axis represents an amplitude (V) of the signal waveform, that is, represents a variation in a voltage value of the amplitude, and the horizontal axis represents time. The signal waveform g31 illustrated on the upper side of FIG. 10 indicates an example of the waveform of the sound signal output from the speaker 11. The signal waveform g32 illustrated on the lower side of FIG. 10 indicates an example of the waveform of the vibration signal output from the actuator 13.

Figure 11:
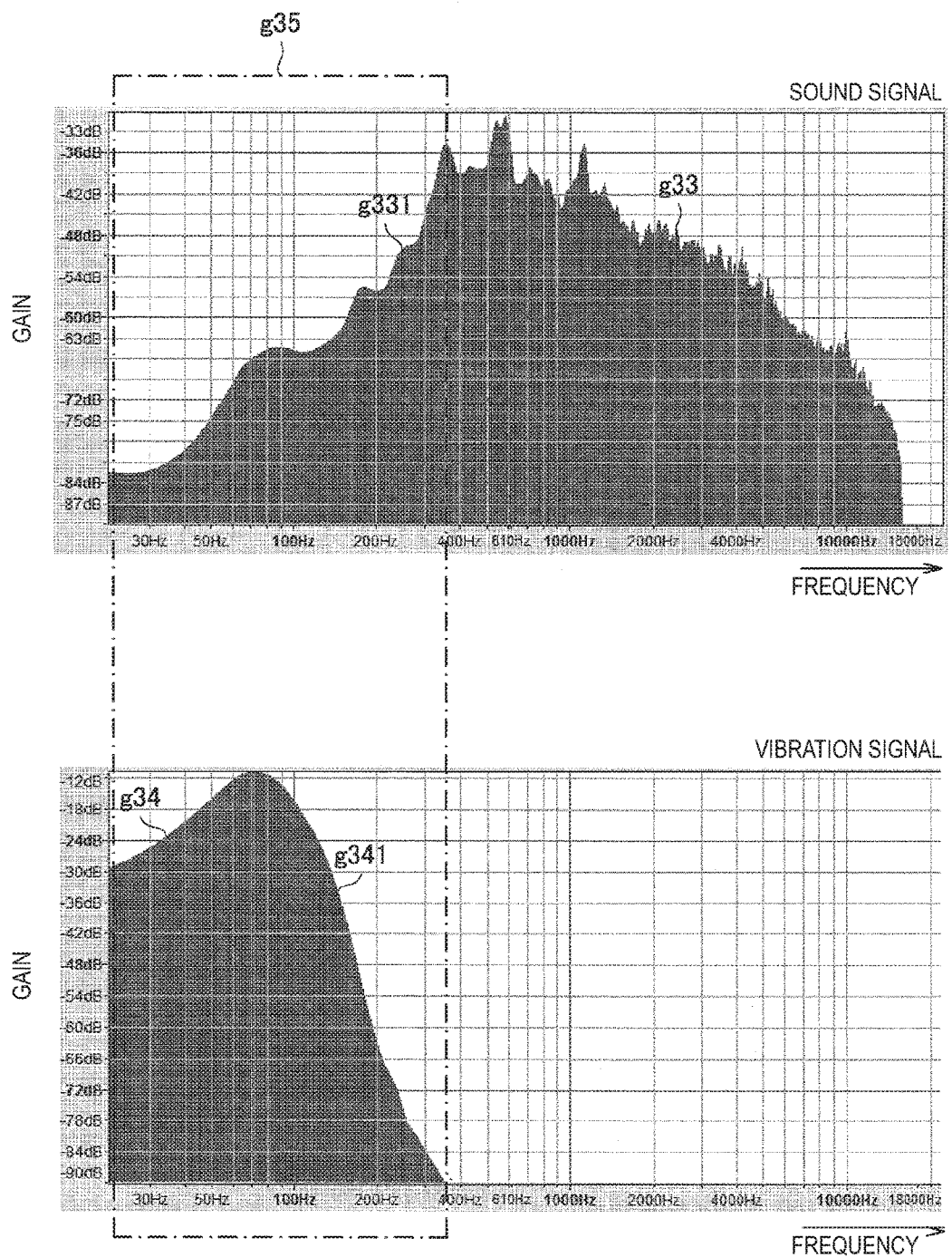
FIG. 11 is a diagram illustrating a distribution of a frequency component of each signal waveform illustrated in FIG. 10.

FIG. 11 illustrates distributions of frequency components of the signal waveforms g31 and g32 illustrated in FIG. 10. In signal waveforms g33 and g34 illustrated on the upper and lower sides of FIG. 11, the vertical axis represents a gain of the signal waveform and the horizontal axis represents a frequency.

As a specific example, in the example illustrated in FIG. 11, the sound signal denoted by reference numeral g331 and the vibration signal denoted by reference signal g341 overlap in a frequency band denoted by reference signal g35. In this case, in the frequency band denoted by reference numeral g35, the sound signal g331 and the vibration signal g341 are superimposed, and thus the user feels the sounds in the frequency band g35 as if they had an increased output compared to sounds in other frequency bands.

Therefore, the signal processing unit 213 may restrict the amplitude of at least one output in the frequency band in which the outputs from the speaker 11 and the actuator 13 overlap (in other words, may restrict the gain or the volume). As a specific example, the signal processing unit 213 may decide an output ratio between the sound output and the vibration output in advance and decide an attenuation amount by which the sound output and the vibration output are attenuated according to the output ratio. For example, when the output ratio between the sound output and the vibration output is set to 1:1, the signal processing unit 213 may attenuate the amplitudes of the sound output and the vibration output to ½. As another example, when the output ratio between the sound output and the vibration output is set to 2:1, the signal processing unit 213 may attenuate the amplitude of the sound output to ⅔ and attenuate the amplitude of the vibration output to ⅓.

As still another example, the signal processing unit 213 may perform weighting based on a ratio between the amplitude of the sound output from the speaker 11 and the amplitude of the vibration output from the actuator 13 and attenuate the amplitudes of the sound output and the vibration output according to the weighting.

1.5. Process

Figure 12:
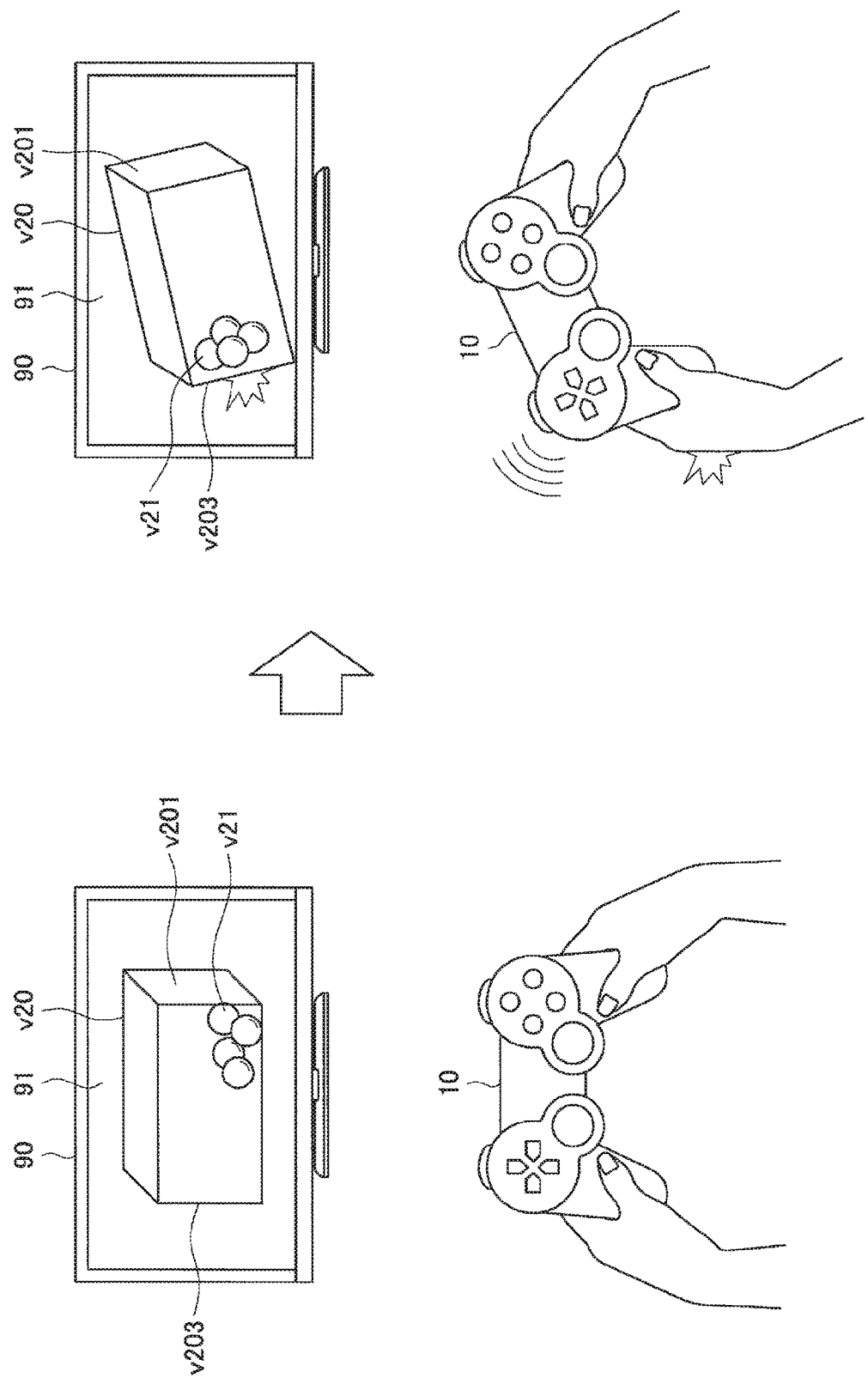
FIG. 12 is an explanatory diagram illustrating the flow of a series of operations of the sensation induction system according to the embodiment.

Next, the flow of a series of operations of the sensation induction system according to the embodiment will be described with reference to FIGS. 12 and 13, focusing on operations of the sensation induction device 10 and the control device 20. FIG. 12 is an explanatory diagram illustrating the flow of the series of operations of the sensation induction system according to the embodiment. FIG. 12 illustrates an example of an operation image when the sensation induction device 10 is configured as a controller of a game console and the like. FIG. 13 illustrates an example of the flow of the series of operations of the sensation induction system according to the embodiment.

In the description, as illustrated in FIG. 12, a case in which the user manipulates a box-like object v20 displayed on the display unit 91 of the display device 90 by tilting the sensation induction device 10 to the right and left so that an object v21 in the object v20 operates according to the manipulation will be described as an example.

(Step S101)

For example, in the example illustrated in the left drawing of FIG. 12, the object v21 is located near the inside of a side surface v201 on the right side of the box-like object v20. As illustrated in the right drawing of FIG. 12, the user is assumed to perform a manipulation of tilting the sensation induction device 10 to the left from this state.

At this time, the user manipulation of tilting the sensation induction device 10 to the left is detected by the detection unit 193 (see FIG. 9) in the sensation induction device 10.

(Step S103)

The detection unit 193 notifies the control device 20 of a control signal indicating details of the detected manipulation, that is, classification of the manipulation (for example, classification indicating the manipulation of tilting the sensation induction device 10), a manipulation direction, and a manipulation amount, via the control unit 14.

(Step S105)

The calculation unit 211 acquires the control signal indicating the details of the manipulation performed on the sensation induction device 10 by the user from the sensation induction device 10 via the network n1. The calculation unit 211 recognizes the classification of the manipulation, the manipulation direction, and the manipulation amount based on the acquired control signal. For example, in the case of the example illustrated in FIG. 12, the calculation unit 211 recognizes how much the user tilts the sensation induction device 10 to the left (for example, at an angle).

For example, the calculation unit 211 calculates the direction of a force acting on the object v20 based on the classification of the manipulation and the manipulation direction and calculates the magnitude of the force acting on the object v20 based on the manipulation amount. The calculation unit 211 calculates a movement direction and a movement amount of the object v20 based on the calculated direction of the force acting on the object v20 and the amount of the force.

The calculation unit 211 calculates a motion direction and a motion amount of the object v21 located inside the object v20 with the movement of the object v20. Here, in this description, the object v21 is assumed to be moved to the left toward the side surface v203 of the object v20 due to the influence of the virtually set gravitational force and collide against the inside of the side surface v203.

The calculation unit 211 notifies the signal processing unit 213 and the display control unit 215 of a result of the physical calculation, for example, information indicating the calculated motion directions or motion speeds of the objects v20 and v21. Accordingly, the signal processing unit 213 and the display control unit 215 recognize that the box-like object v20 is tilted to the left, the object v21 is moved to the left toward the side surface v203 with the movement of the object v20, and the object v21 collides against the side surface v203.

(Step S107)

The signal processing unit 213 generates the control signals for vibrating the actuators 13R and 13L by performing the signal processing on the sound signals output from the speakers 11R and 11R of the sensation induction device 10 based on the result of the physical calculation by the calculation unit 211.

For example, the signal processing unit 213 reads the sound signals corresponding to an operation in which the object v21 is moving from the played-back content and controls the amplitudes of the sound signals output from the speakers 11R and 11L according to the movement of the object v21. As a specific example, the signal processing unit 213 temporally attenuates the amplitude of the sound output from the speaker 11R according to the movement of the object v21 from the right side to the left side of the screen and amplifies the amplitude of the sound output from the speaker 11L.

The signal processing unit 213 generates the control signal for driving the actuator 13R so that the signal output from the speaker 11R is interlocked with the vibration output from the actuator 13R. That is, the signal processing unit 213 generates the control signal for operating the actuator 13R so that the vibration output from the actuator 13R is temporally attenuated in interlock with the attenuation of the sound output from the speaker 11R.

Similarly, the signal processing unit 213 generates the control signal for driving the actuator 13L so that the signal output from the speaker 11L is interlocked with the vibration output from the actuator 13L. That is, the signal processing unit 213 generates the control signal for operating the actuator 13L so that the vibration output from the actuator 13L is temporally attenuated in interlock with the amplification of the sound output from the speaker 11L.

The signal processing unit 213 reads the sound signals corresponding to the operation of the case in which the object v21 collides against the inside wall of the object v20 from the played-back content and controls the amplitudes of the sound signals output from the speakers 11R and 11L according to the collision position (in other words, controls the gains or the volumes of the sound signals). For example, in the example illustrated in FIG. 12, since the object v21 collides against the inside wall of the side surface v203 located on the left side of the screen, the signal processing unit 213 performs control such that the sound signal corresponding to the collision is output from the left speaker 11L.

The signal processing unit 213 controls an output timing of the sound signal such that the sound signal corresponding to the collision is output from the speaker 11L in synchronization with a timing at which the object v21 collides against the inside wall of the side surface v203.

The signal processing unit 213 generates the control signal for driving the actuator 13L so that the sound output from the speaker 11L is interlocked with the vibration output from the actuator 13L. That is, the signal processing unit 213 generates the control signal for driving the actuator 13L so that the tactile sense feedback corresponding to the collision is represented in interlock with the output of the sound signal corresponding to the collision from the speaker 11L. As a specific example, the signal processing unit 213 first reads a pre-generated standard signal for presenting collision between objects from the signal data storage unit 25. Then, the signal processing unit 213 generates the control signal for driving the actuator 13L by controlling the amplitude or the phase of the read standard signal based on the amplitude of the sound signal or the result of the physical calculation by the calculation unit 211.

(Step S109)

The signal processing unit 213 transmits the sound signals output from the speakers 11R and 11L and the control signals for driving the actuators 13R and 13L to the sensation induction device 10.

(Step S111)

The sound signals to be output from the speakers 11R and 11L and the control signals for driving the actuators 13R and 13L which are transmitted from the signal processing unit 213 are received by the control unit 14 of the sensation induction device 10.

The control unit 14 outputs the sound signals received from the control device 20 from the speakers 11R and 11L and drives the actuators 13R and 13L based on the received control signals.

(Step S113)

The display control unit 215 recognizes the motion directions or the motion speeds of the objects v20 and v21 based on the result of the physical calculation by the calculation unit 211 and calculates display positions or display forms (for example, changes in the directions or the shapes) of the objects v20 and v21. The display control unit 215 causes the display device 90 to update the video of the objects v20 and v21 displayed on the display unit 91 based on the calculated display positions or display forms of the objects v20 and v21.

As described above, the control device 20 controls the operations of the objects v20 and v21 displayed on the display unit 91 of the display device 90 based on a manipulation on the sensation induction device 10 by the user. The operations of the objects v20 and v21 displayed on the display unit 91, the sound outputs from the speakers 11R and 11L of the sensation induction device 10, and the vibration outputs from the actuators 13R and 13L are interlocked based on the control from the control device 20. In such a configuration, the sensation induction system according to the embodiment matches orientation among the video displayed on the display unit 91, the sound outputs from the speakers 11R and 11L, and the tactile sense feedback based on the vibration of the actuators 13R and 13L. Therefore, the sensation induction system according to the embodiment can realize the presentation of the tactile sense feedback in which the sense of realism is higher.

In addition to the video displayed on the display unit 91, the sound outputs from the speakers 11R and 11L, the tactile sense feedback based on the vibration of the actuators 13R and 13L, the control device 20 may perform control such that orientation of a user manipulation is coordinated. For example, FIG. 14 is an explanatory diagram illustrating an example when control is performed such that orientation of a user manipulation, a video, a sound output, and tactile sense feedback is coordinated.

In the example illustrated in FIG. 14, a case in which the user manipulates a manipulation device 191R installed on the right side of the casing of the sensation induction device 10 configured as a controller is illustrated. In this case, for example, the control device 20 (not illustrated) displays an object v30 on the right side of the display unit 91 of the display device 90 based on the manipulation on the manipulation device 191R by the user. At this time, the control device 20 feeds a tactile sense back to the right hand of the user by outputting a sound from the speaker 11R installed on the right side of the sensation induction device 10 and vibrating the actuator 13R installed on the right side of the sensation induction device 10 in interlock with the sound output.

In this way, in the sensation induction system illustrated in FIG. 14, by coordinating the orientation of the user manipulation, the video, the sound output, and the tactile sense feedback, it is possible to realize the presentation of the tactile sense feedback in which the sense of realism is higher, and further to improve a sense of immersion at the time of the manipulation.

As another example, when a user interface (UI) displayed on a screen is manipulated, the tactile sense feedback based on the sound outputs from the speakers 11R and 11L and the vibration of the actuators 13R and 13L may be controlled according to a manipulation target.

In this case, for example, the control device 20 (not illustrated) displays a UI (screen) including an object such as a button or a control bar to be subjected to a predetermined manipulation on the display unit 91 and specifies the object in the UI to be subjected to the manipulation target according to details of the user manipulation. Then, when the predetermined object in the UI is subjected to the manipulation, the control device 20 outputs a sound from one of the speakers 11R and 11L and feeds a tactile sense back based on the vibration of one of the actuators 13R and 13L in interlock with the sound output.

At this time, the control device 20 may control the tactile sense feedback based on the sound outputs from the speakers 11R and 11L and the vibration of the actuators 13R and 13L such that the orientation of the manipulation direction of the user, the sound output, and the tactile sense feedback is coordinated. Specifically, for example, when the user performs a manipulation toward the right of the screen and the predetermined object is thus subjected to the manipulation, the control unit 20 may output the sound from the speaker 11R of the sensation induction device 10 and feed the vibration back by driving the actuator 13R.

The control device 20 may control the sound outputs from the speakers 11R and 11L and the tactile sense feedback based on the vibration of the actuators 13R and 13L so that the orientation of the position of the object on the screen to be subjected to the manipulation, the sound outputs, and the tactile sense feedback is coordinated. Specifically, for example, when an object located on the right side of the screen is subjected to the manipulation as a result of the user manipulation, the control unit 20 may output the sound from the speaker 11R of the sensation induction device 10 and feed the vibration back by driving the actuator 13R.

2. EXAMPLES

Next, examples of the sensation induction device 10 according to the embodiment will be described. As described above, in the sensation induction system according to the embodiment, the sensation induction device 10 includes a plurality of actuators and a plurality of speakers. The sensation induction device 10 is configured to include a plurality of sets in which at least one actuator among the plurality of actuators and at least one speaker among the plurality of speakers are mutually associated. A sound output from each speaker and a vibration output from each actuator of the sensation induction device 10 are controlled to be interlocked for each set of mutually associated actuator and speaker. In such a configuration, the sensation induction system according to the embodiment realizes presentation of tactile sense feedback in which a sense of realism is high by matching orientation of the sound output from each speaker with the orientation of tactile sense feedback based on vibration of each actuator.

On the other hand, when the orientation of the sound output from each speaker can match the orientation of the tactile sense feedback based on the vibration of each actuator, the number of mutually associated speakers and actuators and the positions of the mutually associated speakers and actuators are not particularly limited. For example, according to the shape, use, or the like of the casing of the sensation induction device 10, the number of mutually associated speakers and actuators or the positions of the mutually associated speakers and actuators may be appropriately changed. Thus, hereinafter, examples will be described focusing on the configuration of the sensation induction device 10 according to the embodiment.

2.1. Example 1: First Configuration Example of Actuators and Speakers

Figure 15:
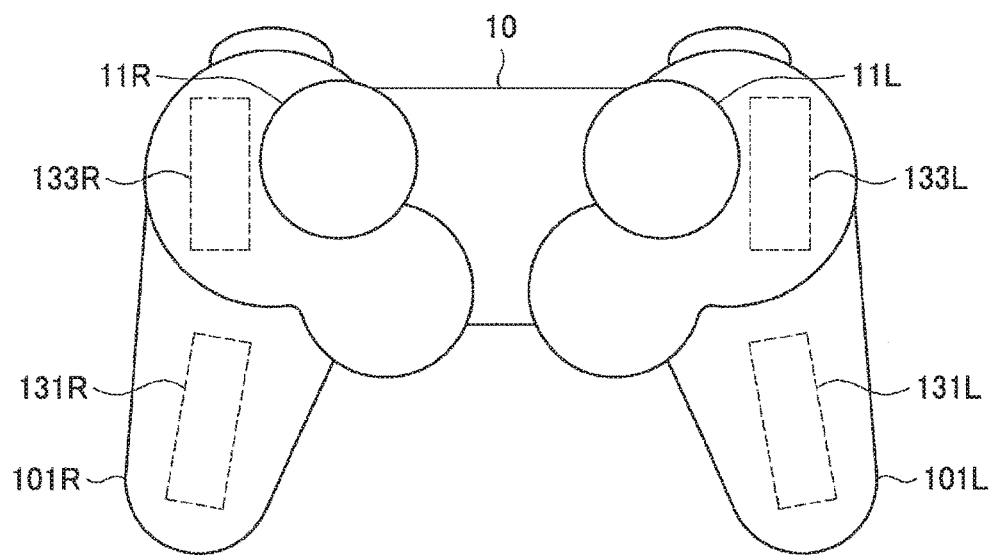
FIG. 15 is an explanatory diagram illustrating a schematic configuration of a sensation induction device according to Example 1.

First, the configuration of the sensation induction device 10 according to Example 1 will be described with reference to FIG. 15. FIG. 15 is an explanatory diagram illustrating an example of a schematic configuration of a sensation induction device 10 according to Example 1. FIG. 15 illustrates the configuration of the sensation induction device 10 when the sensation induction device 10 is held by the user and is viewed from the opposite side to the user (that is, the configuration of the rear side of the sensation induction device 10), as in FIG. 2.

In the above-described embodiment, as illustrated in FIG. 2, the case in which the sensation induction device 10 is configured as a controller and the set of one speaker 11 and one actuator 13 that are mutually associated is installed on the right and left side of the sensation induction device 10 has been described. On the other hand, in the sensation induction device 10 according to the present example, a plurality of actuators 13 are associated with one speaker 11.

For example, as illustrated in FIG. 15, the speakers 11R and 11L are installed on the rear surface of the casing of the sensation induction device 10 according to the present example. Specifically, when the user faces the sensation induction device 10, the speaker 11R is installed on the right rear surface of the casing of the sensation induction device 10 and the speaker 11L is installed on the left rear surface of the casing of the sensation induction device 10. The speakers 11R and 11L illustrated in FIG. 15 correspond to the speakers 11R and 11L in FIG. 2.

The sensation induction device 10 according to the present example includes holding units 101R and 101L which are used for the user to hold the casing near both ends of the casing which are located on mutually opposite sides, as in the example illustrated in FIG. 2.

The sensation induction device 10 according to the present example includes actuators 131R, 133R, 131L, and 133L.

The actuators 131R and 133R are installed on the right side of the casing of the sensation induction device 10 when the user faces the sensation induction device 10. As a specific example, the actuator 131R is installed inside the holding unit 101R in the example illustrated in FIG. 15. The actuator 133R is installed at a different position from the actuator 131R, for example, near the speaker 11R, on the right side of the casing of the sensation induction device 10.

Similarly, the actuators 131L and 133L are installed on the left side of the casing of the sensation induction device 10 when the user faces the sensation induction device 10. As a specific example, the actuator 131L is installed inside the holding unit 101L in the example illustrated in FIG. 15. The actuator 133L is installed at a different position from the actuator 131L, for example, near the speaker 11L, on the left side of the casing of the sensation induction device 10.

In the sensation induction system according to the present example, a sound output from the speaker 11R of the sensation induction device 10 and vibration outputs from the actuators 131R and 133R are controlled to be interlocked. Similarly, a sound output from the speaker 11L of the sensation induction device 10 and vibration outputs from the actuators 131L and 133L are controlled to be interlocked. Hereinafter, when the actuators 131R and 131L are not particularly distinguished from each other, the actuators 131R and 131L are simply referred to as the "actuators 131" in some cases. Similarly, when the actuators 133R and 133L are not particularly distinguished from each other, the actuators 133R and 133L are simply referred to as the "actuators 133" in some cases.

Actuators of which classifications or vibration directions are different may be applied as the actuators 131 and 133.

Figure 16:
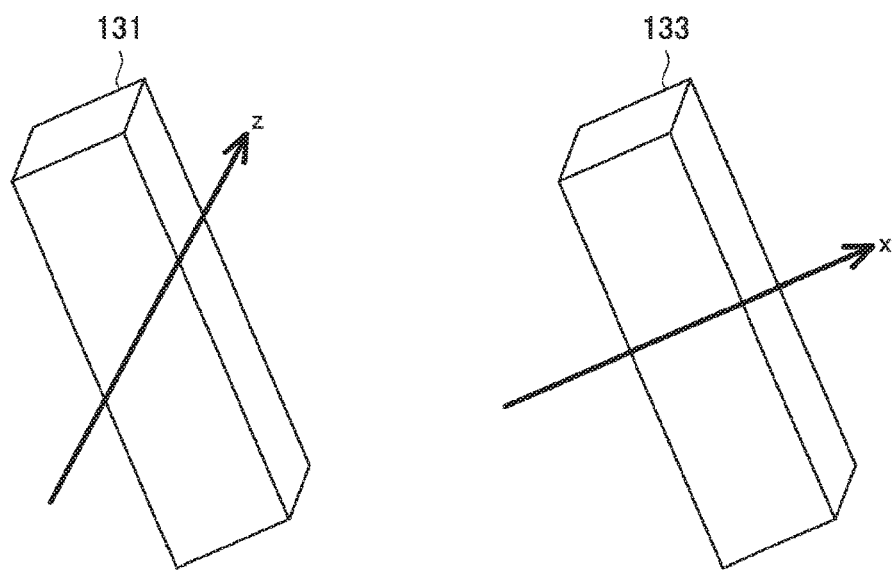
FIG. 16 is an explanatory diagram illustrating examples of actuators according to Example 1.

For example, FIG. 16 is an explanatory diagram illustrating examples of the actuators 131 and 133 according to the present example. For example, in the example illustrated in FIG. 16, the actuator 131 is configured or disposed to vibrate in the z direction among the x, y, and z directions perpendicular to each other. The actuator 133 is configured or disposed to vibrate in a different direction from the actuator 131, for example, in the x direction.

In this way, the actuators 131 and 133 may be configured or disposed to vibrate in mutually different directions so that the amplitudes of the vibration of the actuators 131 and 133 can be individually adjusted. Accordingly, the sensation induction device 10 according to the present example can realize various kinds of vibration (that is, tactile sense feedback) by adjusting a ratio between amplitudes or phases even when actuators vibrating only in one predetermined direction are applied as the actuators 131 and 133. That is, the sensation induction device 10 according to the present example can further improve the sense of realism by realizing various kinds of tactile sense feedback by control of the vibration outputs from the actuators 131 and 133.

It is needless to say that a method of controlling the sound outputs and the vibration outputs when the sound outputs from the speakers 11 and the vibration outputs from the actuators 131 and 133 which are mutually associated are interlocked is not particularly limited. As a specific example, one of the vibration outputs from the actuators 131 and 133 may be controlled to vary linearly, as illustrated in FIG. 6, and the other vibration output may be controlled to vary nonlinearly, as illustrated in FIG. 7. In such a configuration, the sensation induction device 10 according to the present example can realize more various kinds of vibration (that is, tactile sense feedback).

2.2. Example 2: Second Configuration Example of Actuators and Speakers

Next, the sensation induction device 10 according to Example 2 will be described. In the above-described embodiment and example, the examples in which the speakers 11 and the actuators 13 are configured as different devices have been described. On the other hand, for example, devices such as voice coil motors in which speakers and actuators are configured to be integrated may be installed in place of the above-described speakers 11 and actuators 13.

Figure 17:
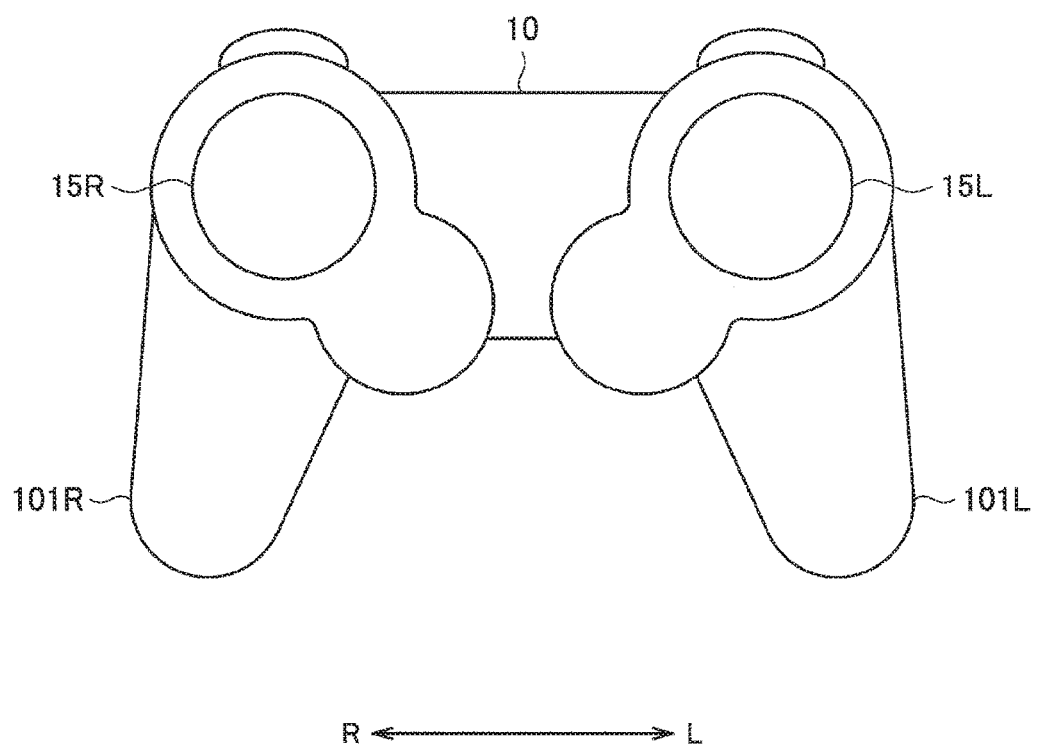
FIG. 17 is an explanatory diagram illustrating a schematic configuration of a sensation induction device according to Example 2.

For example, FIG. 17 illustrates an example of a schematic configuration of the sensation induction device 10 according to the present example and illustrates an example in which devices such as voice coil motors in which speakers and actuators are configured to be integrated are applied. FIG. 17 illustrates the configuration of the sensation induction device 10 when the sensation induction device 10 is held by the user and is viewed from the opposite side to the user (that is, the configuration of the rear side of the sensation induction device 10), as in FIG. 2.

As illustrated in FIG. 17, voice coil motors 15R and 15L are installed on the rear surface of the casing of the sensation induction device 10 according to the present example. Specifically, when the user faces the sensation induction device 10, the voice coil motor 15R is installed on the right rear surface of the casing of the sensation induction device 10 and the voice coil motor 15L is installed on the left rear surface of the casing of the sensation induction device 10.

The voice coil motor 15R plays the same role as the speaker 11R and the actuator 13R in the example described with reference to FIG. 2. The voice coil motor 15L plays the same role as the speaker 11L and the actuator 13L in the example described with reference to FIG. 2. Hereinafter, when the voice coil motors 15R and 15L are not particularly distinguished from each other, the voice coil motors 15R and 15L are simply referred to as the "voice coil motors 15" in some cases.

When the voice coil motors 15 are installed in place of the speakers 11 and the actuators 13, for example, the control device 20 may drive the voice coil motors 15 based on combined signals obtained by combining the vibration signals indicating the vibration with the sound signals. In this case, for example, the voice coil motors 15 may output a signal with a high-frequency band equal to or greater than a predetermined frequency (for example, 300 Hz or more) among the combined signals as a sound signal and output a signal with a low-frequency band equal to or less than the predetermined frequency (for example, 1000 Hz or less) as a vibration signal.

The voice coil motors 15 are configured to be able to vibrate only in one direction in some cases. In this case, as described above, the control device 20 may generate a vibration signal in which the dimension of the vibration output is coordinated with the dimension of the voice coil motor 15 and generate a combined signal by combining the vibration signal and the sound signal.

As in the sensation induction device 10 according to Modification Example 2, as described above, devices such as voice coil motors in which the speakers and the actuators are configured to be integrated can also be applied in place of the speakers and the actuators.

2.3. Example 3: Example of Application to Portable Terminal

Next, an example of a configuration when the sensation induction device 10 according to the embodiment is configured as a portable terminal such as a smartphone will be described according to Modification Example 3. Hereinafter, a sensation induction device according to the present example is referred to as a "sensation induction device 30" in some cases.

First, an overview of the sensation induction device 30 according to the present example will be described with reference to FIG. 18. FIG. 18 is an explanatory diagram illustrating an overview of the sensation induction device 30 according to the present example. The left drawing of FIG. 18 illustrates a case in which the casing of the sensation induction device 30 is held vertically and the right drawing of FIG. 18 illustrates a case in which the casing of the sensation induction device 30 is held horizontally. In this way, in the present example, the description will be made assuming that the sensation induction device 30 can be configured to be held by switching the direction of the casing.

Figure 19:
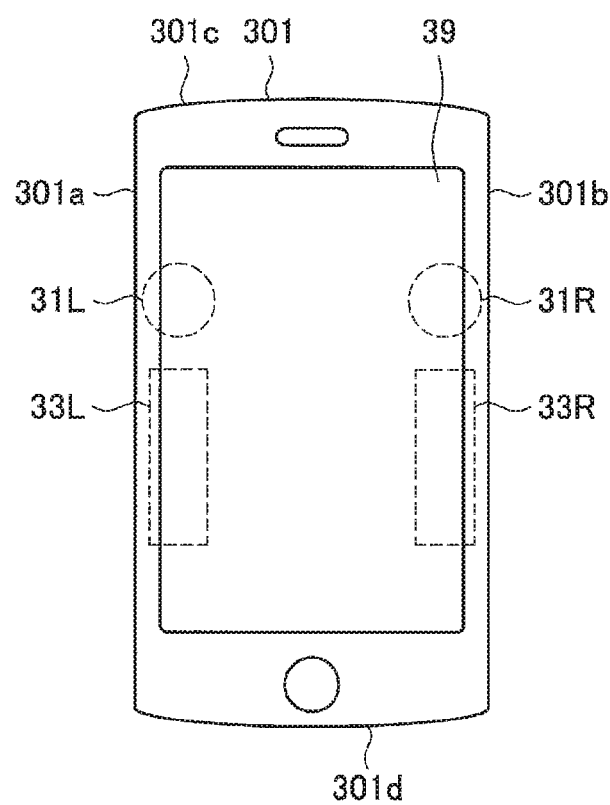
FIG. 19 is an explanatory diagram illustrating an example of a schematic configuration of the sensation induction device according to Example 3.

For example, FIG. 19 illustrates an example of a schematic configuration of the sensation induction device 30 according to the present example. Hereinafter, when the sensation induction device 30 illustrated in FIG. 19 is particularly distinguished from other configurations, the sensation induction device 30 is referred to as a "sensation induction device 30*a*" in some cases.

In the example illustrated in FIG. 19, the configuration of the sensation induction device 30*a* viewed from the user side when the users vertically holds the sensation induction device 30 so that the user faces the front surface of the sensation induction device 30*a* (that is, the user faces the sensation induction device 30*a*) is illustrated. Specifically, when the user holds the sensation induction device 30*a* to face the front surface of the sensation induction device 30*a*, that is, a surface on which a display unit such as a display is installed, the right side of the drawing corresponds to the right side (R) viewed by the user and the left side of the drawing corresponds to the left side (L) viewed by the user.

As illustrated in FIG. 19, in the sensation induction device 30*a* according to the present example, a display unit 39 (that is, a display) is installed on the front surface of the sensation induction device 30*a*. The display unit 39 may be configured as a touch panel.

Hereinafter, to facilitate the description, end portions installed along the periphery of the front surface of the casing of the sensation induction device 30*a* are referred to as "end portions 301" in some cases. Among the end portions 301, end portions on the left side, the right side, the upper side, and the lower side which are configured as the end portions 301 when the sensation induction device 30*a* is held vertically are referred to as end portions 301*a*, 301*b*, 301*c*, and 301*d*, respectively, in some cases.

As illustrated in FIG. 19, speakers 31R and 31L are installed in the sensation induction device 30*a* according to the present example. The speaker 31L is installed on the rear surface of the sensation induction device 30*a* near the end portion 301*a* on the left side of the sensation induction device 30*a*. Similarly, the speaker 31R is installed on the rear surface of the sensation induction device 30*a* near the end portion 301*b* on the right side of the sensation induction device 30*a*.

Actuators 33R and 33L are installed in the sensation induction device 30*a* according to the present example. The actuator 33L is installed inside the casing of the sensation induction device 30*a* near the end portion 301*a* on the left side of the sensation induction device 30*a*. Similarly, the actuator 33R is installed inside the casing of the sensation induction device 30*a* near the end portion 301*b* on the right side of the sensation induction device 30*a*.

The sensation induction device 30*a* according to the embodiment performs control such that a sound output from the speaker 31R and a vibration output from the actuator 33R are interlocked. Similarly, the sensation induction device 30*a* performs control such that a sound output from the speaker 31L and a vibration output from the actuator 33L are interlocked.

As illustrated in FIG. 19, when the end portion 301*c* is located on the upper side as viewed by the user, the speaker 31L and the actuator 33L are located on the left side and the speaker 31R and the actuator 33R are located on the right side with respect to the user. In such a direction, the sensation induction device 30*a* outputs a sound from the speaker 31L and vibrates the actuator 33L in interlock with the sound output when a tactile sense is fed back to the user on the left side. Similarly, the sensation induction device 30*a* outputs a sound from the speaker 31R and vibrates the actuator 33R in interlock with the sound output when a tactile sense is fed back to the user on the right side.

On the other hand, when the end portion 301*d* is located on the upper side as viewed by the user, the speakers 31L and the actuator 33L are located on the right side and the speaker 31R and the actuator 33R are located on the left side with respect to the user. In this case, for example, the sensation induction device 30*a* may perform control such that the sound output from each speaker and the vibration output from each actuator 33 are reverse to the case in which the end portion 301*c* is located on the upper side as viewed by the user.

Specifically, the sensation induction device 30*a* may output the sound from the speaker 31R and vibrate the actuator 33R in interlock with the sound output when the tactile sense is fed back to the user on the left side. Similarly, the sensation induction device 30*a* may output the sound from the speaker 31L and vibrate the actuator 33L in interlock with the sound output when the tactile sense is fed back to the user on the right side.

For example, it is needless to say that the sensation induction device 10*a* (that is, the casing of the sensation induction device 10*a*) can recognize a direction in which the casing is held by the user by containing an acceleration sensor in a sensation induction device 10*a*.

Figure 20:
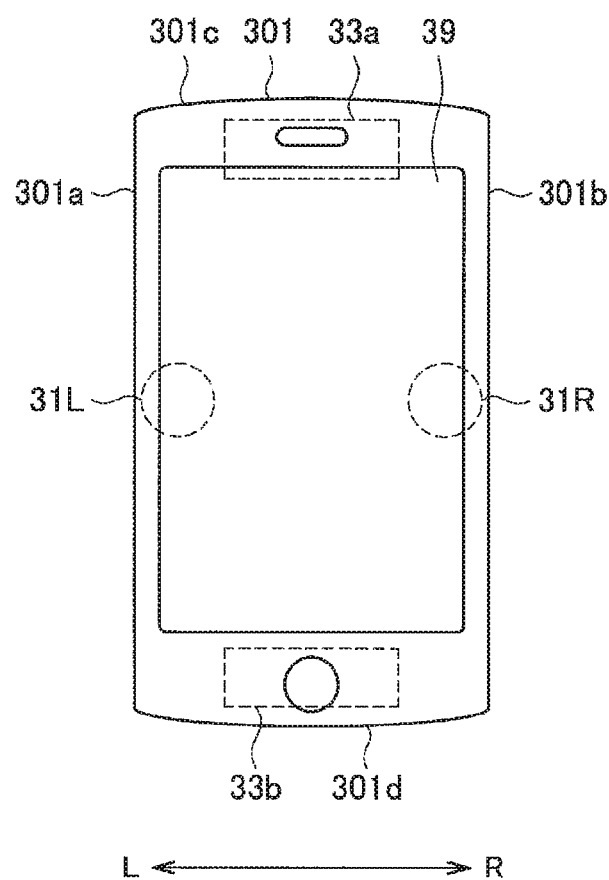
FIG. 20 is an explanatory diagram illustrating an example of a schematic configuration of the sensation induction device according to Example 3.

Next, another example of the sensation induction device 30 according to the example will be described with reference to FIG. 20. FIG. 20 illustrates another example of a schematic configuration of the sensation induction device 30 according to the present example. Hereinafter, when the sensation induction device 30 illustrated in FIG. 20 is particularly distinguished from other configurations, the sensation induction device 30 is referred to as a "sensation induction device 30*b*" in some cases.

The sensation induction device 30*b* illustrated in FIG. 20 is different from the sensation induction device 30*a* described above with reference to FIG. 19 in positions at which the actuators 33 are installed. Therefore, hereinafter, the configuration of the sensation induction device 30*b* will be described focusing on a different configuration from the sensation induction device 30*a* illustrated in FIG. 19, that is, the configuration of the actuators 33.

As illustrated in FIG. 20, actuators 33*a* and 33*b* are installed in the sensation induction device 30*b* according to the present example. The actuator 33*a* is installed inside the casing of the sensation induction device 30*b* near the end portion 301*c* on the upper side of the sensation induction device 30*b*. Similarly, the actuator 33*b* is installed inside the casing of the sensation induction device 30*b* near the end portion 301*d* on the right side of the sensation induction device 30*b*.

When the sensation induction device 30*b* (the casing of the sensation induction device 30*b*) according to the present example is held vertically, the vibration output of one of the actuators 33*a* and 33*b* is interlocked with the sound output from the speaker 31R and the vibration output of the other actuator is interlocked with the sound output from the speaker 31L.

When the sensation induction device 30*b* is held horizontally, the vibration output from the actuator 33 located on the right side as viewed by the user between the actuators 33*a* and 33*b* is interlocked with the sound output from the speaker 31R (that is, the sound output oriented toward the right ear of the user). Similarly, the vibration output from the actuator 33 located on the left side as viewed by the user between the actuators 33*a* and 33*b* is interlocked with the sound output from the speaker 31L (that is, the sound output oriented toward the left ear of the user) in the sensation induction device 30*b*.

As described above, a combination of the speakers 31 and actuators 33 may be appropriately changed according to a direction in which the sensation induction device 30 (that is, the casing of the sensation induction device 30*b*) according to the present example is held.

Figure 21:
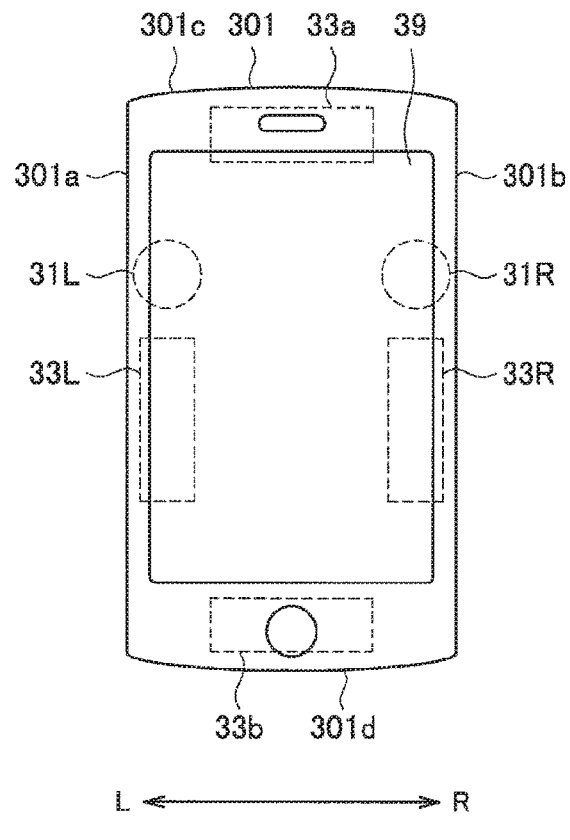
FIG. 21 is an explanatory diagram illustrating an example of a schematic configuration of the sensation induction device according to Example 3.

The example illustrated in FIG. 19 and the example illustrated in FIG. 20 may be combined. For example, FIG. 21 illustrates another example of a schematic configuration of the sensation induction device 30 according to the present example. Hereinafter, when the sensation induction device 30 illustrated in FIG. 21 is particularly distinguished from other configurations, the sensation induction device 30 is referred to as a "sensation induction device 30*c*" in some cases.

As illustrated in FIG. 21, both of the actuators 33R and 33L described with reference to FIG. 19 and the actuators 33*a* and 33*b* described with reference to FIG. 20 are installed in the sensation induction device 30*c*. The actuators 33R, 33L, 33*a*, and 33*b* installed in the sensation induction device 30*c* can be controlled in a similar manner to that described above with reference to FIGS. 19 and 20.

As another example, sensation induction device 30*c* may perform control such that the amplitude of the vibration output associated with the sound output from the same speaker 31 among the vibration outputs from the actuators 33R, 33L, 33*a*, and 33*b* is interlocked with the sound output. The specific control details are the same as those of the sensation induction device 10 according to Example 1 described with reference to FIG. 15.

As described above in Example 3, the sensation induction device according to the embodiment can also be applied to a portable terminal such as a smartphone. The sensation induction device 30 according to the present example may appropriately change a combination of the speakers 31 and actuators 33 according to a direction in which the sensation induction device 30 (that is, the casing of the sensation induction device 30*b*) is held. The example of the case of the smartphone has been described above, but it is needless to say that the present disclosure is not necessarily limited to the smartphone. For example, the sensation induction device described in Example 3 can also be applied similarly to a portable game terminal in which a display or a manipulation unit is installed.

2.4. Example 4: Example of Sensation Induction Device

Figure 22:
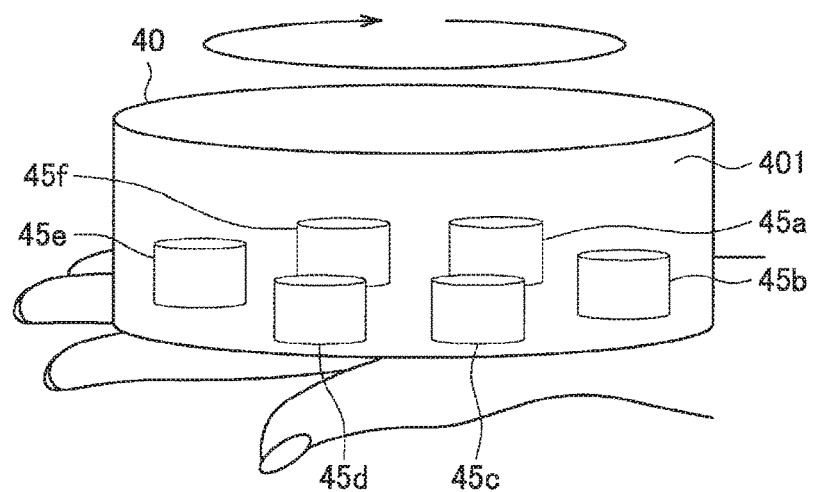
FIG. 22 is an explanatory diagram illustrating an example of a schematic configuration of the sensation induction device according to Example 4.

Next, an example of a relation between the shape or use of the sensation induction device and disposition of the speakers and the actuators in the sensation induction device according to the embodiment will be described according to Example 4. First, an example of the sensation induction device according to Example 4 will be described with reference to FIG. 22. FIG. 22 is an explanatory diagram illustrating an example of a schematic configuration of the sensation induction device according to the present example. Hereinafter, a sensation induction device illustrated in FIG. 22 is referred to as a "sensation induction device 40" in some cases.

As illustrated in FIG. 22, the casing of the sensation induction device 40 is formed in a cylindrical shape that has circular top and bottom surfaces and a side surface 401 installed along the circumferences of the top and bottom surfaces. For example, as illustrated in FIG. 22, the sensation induction device 40 is held by the user so that the bottom surface of the sensation induction device 40 is supported from the lower side.

In the sensation induction device 40, voice coil motors 45*a* to 45*f* are installed on the bottom surface inside the casing to be arranged in order along the inside of the side surface 401. When the voice coil motors 45*a* to 45*f* are not particularly distinguished from each other, the voice coil motors 45*a* to 45*f* are simply referred to as "voice coil motors 45" in some cases.

For example, the voice coil motors 45*a* to 45*f* are disposed so that sounds are output from the bottom surface of the sensation induction device 40 to the outside. For example, the voice coil motors 45*a* to 45*f* are disposed so that the voice coil motors 45*a* to 45*f* vibrate in a direction from the bottom surface to the top surface of the sensation induction device 40. Sound outputs and the vibration outputs from the voice coil motors 45*a* to 45*f* are controlled to be interlocked for the voice coil motors 45, as in the sensation induction device according to the above-described embodiment and examples.

In such a configuration, the sensation induction device 40 enables a kinesthetic sense presented to the user to have directivity. As a specific example, the sensation induction device 40 may output tactile sense feedback based on the sounds and the vibration in the order of the voice coil motors 45*a* to 45*f* along the inside of the side surface 401. Under such control, the sensation induction device 40 can feed a tactile sense, which simulates a state in which a sphere rolls along the inside of the side surface 401 inside the casing of the sensation induction device 40, back to the user.

Of course, it is needless to say that the voice coil motors 45 illustrated in FIG. 22 may be substituted with sets of speakers and actuators associated so that the outputs are interlocked.

Figure 23:
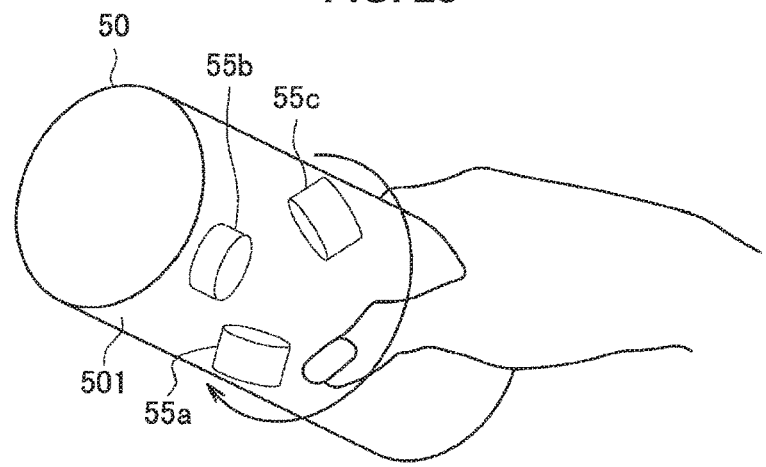
FIG. 23 is an explanatory diagram illustrating an example of a schematic configuration of the sensation induction device according to Example 4.

Another example of the sensation induction device according to the present example will be described with reference to FIG. 23. FIG. 23 is an explanatory diagram illustrating an example of a schematic configuration of the sensation induction device according to the present example. Hereinafter, the sensation induction device illustrated in FIG. 23 is referred to as a "sensation induction device 50" in some cases.

As illustrated in FIG. 23, the casing of the sensation induction device 50 is formed in a cylindrical shape (rod shape) with circular top and bottom surfaces and a side surface 501 installed along the circumferences of the top and bottom surfaces. For example, as illustrated in FIG. 23, the sensation induction device 50 is held by the user so that the side surface 501 of the sensation induction device 50 is supported.

In the sensation induction device 50, voice coil motors 55a to 55c are installed to be arranged in order along the inside of the side surface 501. When the voice coil motors 55a to 55c are not particularly distinguished from each other, the voice coil motors 55a to 55c are simply referred to as "voice coil motors 55" in some cases.

For example, the voice coil motors 55a to 55c are disposed so that sounds are output from the side surface 501 of the sensation induction device 50 to the outside. For example, the voice coil motors 55a to 55c are disposed so that the voice coil motors 55a to 55c vibrate in radial directions of the top and bottom surfaces of the sensation induction device 50. Sound outputs and the vibration outputs from the voice coil motors 55a to 55c are controlled to be interlocked for the voice coil motors 55, as in the sensation induction device according to the above-described embodiment and examples.

In such a configuration, the sensation induction device 50 enables a kinesthetic sense presented to the user to have directivity. As a specific example, the sensation induction device 50 may output tactile sense feedback based on the sounds and the vibration in the order of the voice coil motors 55a to 55c along the inside of the side surface 501 and may bias control amounts (for example, control amounts of gains or volumes) of the amplitudes of the sound outputs and the vibration outputs among the voice coil motors 55a to 55c. At this time, the sensation induction device 50 may control the phases of the sound outputs and the vibration outputs from the voice coil motors 55a to 55c. Under such control, the sensation induction device 50 can present a kinesthetic sense having directivity to the user to guide the user in a desired direction using the casing of the sensation induction device 50 as a standard.

Of course, it is needless to say that the voice coil motors 45 illustrated in FIG. 23 may be substituted with sets of speakers and actuators associated so that the outputs are interlocked.

As described above, the shape of the casing of the sensation induction device according to the embodiment is not particularly limited, but positions and directions in which the speakers and the actuators (or the voice coil motors) are disposed may be appropriately changed according to the shape or use of the casing. As apparent from the examples illustrated in FIGS. 22 and 23, it is needless to say that the speakers and the actuators (or the voice coil motors) may be disposed 3-dimensionally.

2.5. Example 5: Example of Application to Controller

Figure 24:
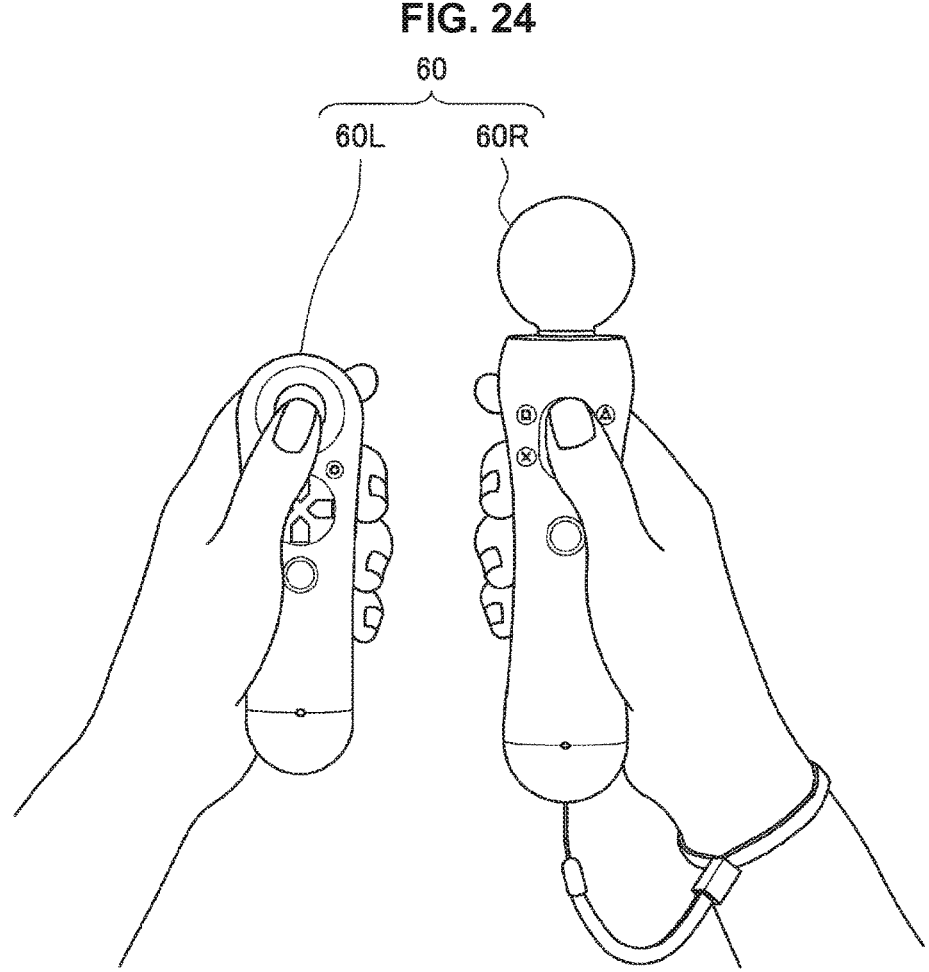
FIG. 24 is an explanatory diagram illustrating an overview of a sensation induction device according to Example 5.
Figure 25:
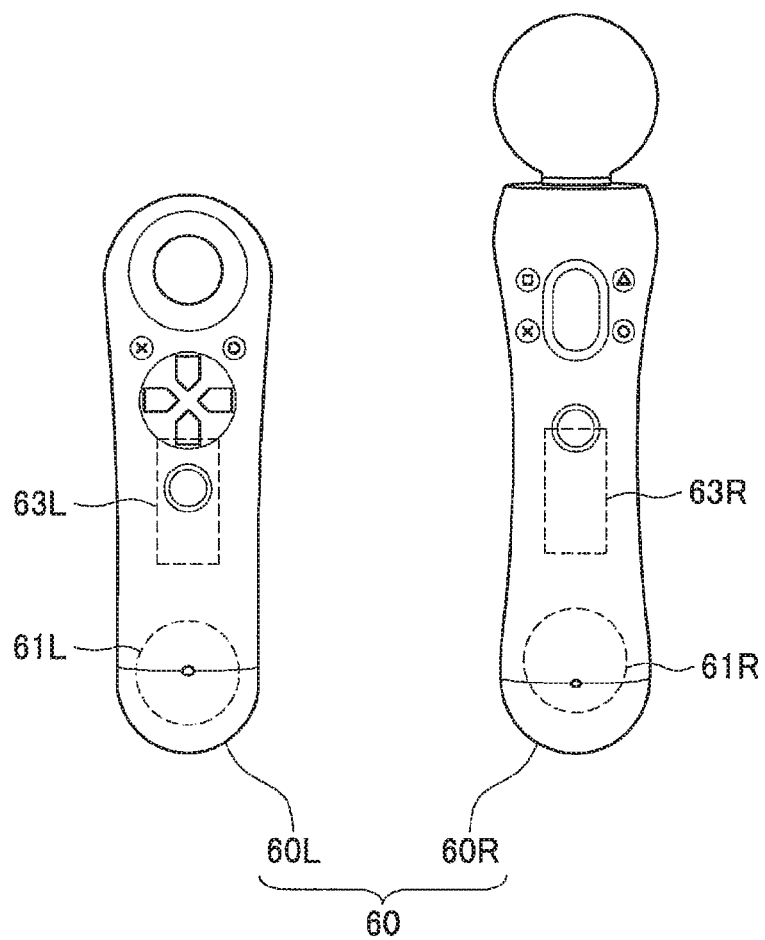
FIG. 25 is an explanatory diagram illustrating an example of a schematic configuration of the sensation induction device according to Example 5.

Next, a sensation induction device according to Example 5 will be described with reference to FIGS. 24 and 25. FIG. 24 is an explanatory diagram illustrating an overview of a sensation induction device according to the present example. FIG. 25 is an explanatory diagram illustrating an example of a schematic configuration of the sensation induction device according to the present example.

As illustrated in FIG. 24, a sensation induction device 60 according to the present example is configured to operate such that different casings 60L and 60R are mutually interlocked. For example, in the example illustrated in FIG. 24, the casing 60L is configured to be held by the left hand of the user and the casing 60R is configured to be held by the right hand of the user. In each of the casings 60R and 60L, an input device which is manipulated by the user or a sensor that detects a change in the direction or position of the casing (for example, an acceleration sensor or a gyro sensor (angular velocity sensor)) may be installed.

A speaker 61R and an actuator 63R are installed in the casing 60R. For example, the speaker 61R is installed at a position close to the body of the user when the user holds the casing 60R (for example, a position corresponding to a position near a hand). The actuator 63R is installed inside the casing 60R near the portion that is held when the casing 60R is held by the user.

Similarly, a speaker 61L and an actuator 63L are installed in the casing 60L. For example, the speaker 61L is installed at a position close to the body of the user when the user holds the casing 60L (for example, a position corresponding to a position near a hand). The actuator 63L is installed inside the casing 60L near the portion that is held when the casing 60L is held by the user.

The speaker 61R is a speaker that outputs a sound mainly toward the right ear of the user. Similarly, the speaker 61L is a speaker that outputs a sound mainly toward the left ear of the user.

The actuator 63R vibrates to feed a tactile sense to the hand of the user holding the casing 60R (that is, the right hand of the user). Similarly, the actuator 63L vibrates to feed a tactile sense to the hand of the user holding the casing 60L (that is, the left hand of the user).

A vibration output from the actuator 63R installed in the casing 60R is controlled to be interlocked with a sound output from the speaker 61R installed in the casing 60R. Similarly, a vibration output from the actuator 63L installed in the casing 60L is controlled to be interlocked with a sound output from the speaker 61L installed in the casing 60L. Control performed such that the sound output from each speaker 61 and the vibration output from each actuator 63 are interlocked is the same as that of the above-described embodiment and examples.

As described above in Example 5, the sensation induction device according to the embodiment may be configured such that the plurality of casings are interlocked. In this case, as described with reference to FIG. 23, control is preferably performed such that at least the outputs (that is, the sound output and the vibration output) are interlocked between the speaker and the actuator installed in the same casing.

3. CONCLUSION

As described above, in the sensation induction system according to the embodiment, the sensation induction device includes the plurality of actuators and the plurality of speakers. The sensation induction device is configured to include the plurality of sets in which at least one actuator among the plurality of actuators and at least one speaker among the plurality of speakers are mutually associated. The sound output from each speaker and the vibration output from each actuator of the sensation induction device are controlled to be interlocked for each set of mutually associated actuator and speaker. Based on such a configuration, the sensation induction system according to the embodiment matches the orientation of the sound output from each speaker with the orientation of tactile sense feedback based on vibration of each actuator. Accordingly, the sensation induction device according to the embodiment can further improve a sense of realism or a sense of immersion.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A sensation induction device including:

a plurality of actuators; and a plurality of speakers, wherein the sensation induction device includes a plurality of sets in which at least one actuator among the plurality of actuators and at least one speaker among the plurality of speakers are mutually associated, and an output from the actuator and an output from the speaker are controlled to be interlocked for each set of mutually associated actuator and speaker.

(2)

The sensation induction device according to (1), further including:

a casing configured to contain the plurality of actuators and the plurality of speakers, wherein the actuators associated with the speakers included in the different sets are installed in the casing to be spaced from each other.

(3)

The sensation induction device according to (2), wherein the casing includes an end portion, and the actuators associated with the speakers included in the different sets are installed near the end portion to be spaced from each other.

(4)

The sensation induction device according to (3), wherein the casing includes a plurality of the end portions different from each other, and the actuators associated with the speakers included in the different sets are installed near the different end portions.

(5)

The sensation induction device according to (2), wherein the casing includes a plurality of holding portions for holding the casing, and the actuators associated with the speakers included in the different sets are installed inside or near the different holding portions.

(6)

The sensation induction device according to any one of (2) to (5), wherein the speakers associated with the actuators included in the different sets are installed in the casing to be spaced from each other.

(7)

The sensation induction device according to any one of (2) to (6), further including:

a detection unit configured to detect a change in a position or a direction of the casing, wherein the output from the actuator and the output from the speaker are controlled to be interlocked for each set of mutually associated speaker and actuator in interlock with the change in the position or the direction of the casing.

(8)

The sensation induction device according to any one of (1) to (7), wherein a plurality of the actuators are associated with at least one of the speakers, and the plurality of actuators vibrate in relatively different directions.

(9)

The sensation induction device according to any one of (1) to (8), wherein the actuator associated with the speaker is installed near the associated speaker.

(10)

The sensation induction device according to any one of (1) to (9), wherein the mutually associated actuator and speaker are configured to be integrated.

(11)

The sensation induction device according to any one of (1) to (10), wherein the output from one of the mutually associated actuator and speaker is controlled based on another control signal generated based on a control signal for controlling the output from the other of the actuator and the speaker.

(12)

The sensation induction device according to any one of (1) to (10), wherein the outputs from the mutually associated actuator and speaker are controlled based on a result of physical calculation for feeding a sensation back to a user.

(13)

The sensation induction device according to any one of (1) to (10), wherein the outputs from the mutually associated actuator and speaker are controlled based on at least one of a shape and roughness of a surface of an object in a video calculated based on an analysis result of the video.

(14)

The sensation induction device according to any one of (1) to (13), wherein an amplitude of at least one of the outputs from the mutually associated actuator and speaker is restricted in a frequency band in which the outputs from the actuator and speaker overlap.

(15)

The sensation induction device according to any one of (1) to (14), further including:

a control unit configured to control the outputs from the mutually associated actuator and speaker so that the outputs from the actuator and speaker are interlocked.

(16)

The sensation induction device according to any one of (1) to (15), wherein the outputs from the mutually associated actuator and speaker are controlled to be interlocked with a video output displayed on a display unit.

(17)

The sensation induction device according to (16), further including:

the display unit.

(18)

The sensation induction device according to any one of (1) to (17), wherein the outputs from the mutually associated actuator and speaker are controlled to be interlocked with a user input via a manipulation unit.

(19)

The sensation induction device according to (18), further including:

the manipulation unit.

(20)

The sensation induction device according to any one of (1) to (14), wherein the outputs from the mutually associated actuator and speaker are controlled to be mutually interlocked based on a user input via a manipulation unit and a video output displayed on a display unit.

(21)

The sensation induction device according to (20), wherein the outputs from the mutually associated actuator and speaker are controlled to be mutually interlocked according to a manipulation target in the video output decided based on the user input.

(22)

A sensation induction system including:

a sensation induction device that includes a plurality of actuators and a plurality of speakers and includes a plurality of sets in which at least one actuator among the plurality of actuators and at least one speaker among the plurality of speakers are mutually associated;

an information processing device configured to output a control signal for controlling an operation of the sensation induction device; and a control unit configured to perform control such that an output from the actuator and an output from the speaker are interlocked for each set of mutually associated actuator and speaker based on the control signal.

(23)

A control device including:

a signal processing unit configured to generate a control signal for performing control such that, in a sensation induction device that includes a plurality of actuators and a plurality of speakers and includes a plurality of sets in which at least one actuator among the plurality of actuators and at least one speaker among the plurality of speakers are mutually associated, an output from the actuator and an output from the speaker are interlocked for each set of mutually associated actuator and speaker; and an output unit configured to output the generated control signal to the sensation induction device.

(24)

A sensation induction method including:

outputting a control signal for performing control of an operation of a sensation induction device that includes a plurality of actuators and a plurality of speakers and includes a plurality of sets in which at least one actuator among the plurality of actuators and at least one speaker among the plurality of speakers are mutually associated; and performing control based on the control signal such that an output from the actuator and an output from the speaker are interlocked for each set of mutually associated actuator and speaker.

REFERENCE SIGNS LIST 10 sensation induction device
101R, 101L holding unit
11, 11R, 11L speaker
12 communication unit
13, 13R, 13L actuator
131, 131R, 131L actuator
14 control unit
15, 15R, 15L voice coil motor
19 input unit
191 manipulation unit
193 detection unit
20 control device
21 control unit
211 calculation unit
213 signal processing unit
215 display control unit
23 communication unit
25 signal data storage unit
30, 30a to 30c sensation induction device
31, 31R, 31L speaker
33, 33R, 33L, 33a, 33b actuator
39 display unit
40 sensation induction device
45, 45a to 45f voice coil motor
50 sensation induction device
55, 55a to 55c voice coil motor
60 sensation induction device
60R, 60L casing
61, 61R, 61L speaker
63, 63R, 63L actuator
90 display device
91 display unit

The invention claimed is:

1. A sensation induction device, comprising:

a plurality of actuators; and a plurality of speakers, wherein at least one actuator among the plurality of actuators and at least one speaker among the plurality of speakers are mutually associated in a first set of a plurality of sets of the plurality of actuators and the plurality of speakers, a first output signal from the at least one actuator overlaps a second output signal from the at least one speaker in a determined frequency band, such that the first output signal of the at least one actuator and the second output signal of the at least one speaker are interlocked for the first set, and an amplitude of at least one of the first output signal or the second output signal is attenuated in the determined frequency band based on an output ratio between the first output signal and the second output signal.

2. The sensation induction device according to claim 1, further comprising:

a casing configured to contain the plurality of actuators and the plurality of speakers, wherein the at least one actuator associated with the at least one speaker in each set of the plurality of sets are installed in the casing at different positions spaced from each other.

3. The sensation induction device according to claim 2, wherein the casing includes at least one end portion, the at least one end portion is installed along a periphery of a front surface of the casing, and the first set and a second set of the plurality of sets are installed at the end portion.

4. The sensation induction device according to claim 3, wherein
the casing includes a plurality of end portions,
each end portion of the plurality of end portions is installed along the periphery of the front surface of the casing, and
the first set is installed at a first end portion of the plurality of end portions and the second set of the plurality of sets is installed at a second end portion of the plurality of end portions.

5. The sensation induction device according to claim 2, wherein
the casing includes a plurality of holding portions to hold the casing, and
the first set is installed one of on a left side of the sensation induction device or inside a first holding portion of the plurality of holding portions and a second set of the plurality of sets is installed one of inside a second holding portion of the plurality of holding portions or on a right side of the sensation induction device.

6. The sensation induction device according to claim 2, wherein the first set and a second set of the plurality of sets are installed in the casing at the different positions spaced from each other.

7. The sensation induction device according to claim 2, further comprising a control circuit configured to control the sensation induction device, wherein
the control circuit is configured to control a sensor to detect a change in a position of the casing or a change in a direction of the casing, and
the interlock is controlled based on at least one of the change in the position of the casing or the change in the direction of the casing.

8. The sensation induction device according to claim 1, wherein
the plurality of actuators is associated with at least one of the plurality of speakers, and
the plurality of actuators vibrates in different directions.

9. The sensation induction device according to claim 1, wherein the at least one actuator associated with the at least one speaker is installed adjacent to the at least one speaker.

10. The sensation induction device according to claim 1, wherein the at least one actuator and the at least one speaker are integrated with each other.

11. The sensation induction device according to claim 1, wherein
a third output from one of the at least one actuator or the at least one speaker is controlled based on a first control signal that is generated based on a second control signal, and
the second control signal is generated to control a fourth output from other of the at least one actuator or the at least one speaker.

12. The sensation induction device according to claim 1, wherein the first output signal and the second output signal from each of the at least one actuator and the at least one speaker is controlled based on a result of physical calculation to feed a sensation back to a user.

13. The sensation induction device according to claim 1, wherein the first output signal and the second output signal from each of the at least one actuator and the at least one speaker is controlled based on:
at least one of a shape or roughness of a surface of an object in a video calculated based on an analysis of the video, and
a frictional force generated with the at least one of the shape or the roughness of the surface of the object.

14. The sensation induction device according to claim 1, wherein the first output signal from the at least one actuator and the second output signal from the at least one speaker are controlled to be interlocked with a video output displayed on a display device.

15. The sensation induction device according to claim 14, further comprising the display device.

16. A sensation induction system, comprising:
a sensation induction device that includes:
a plurality of actuators; and
a plurality of speakers, wherein
at least one actuator among the plurality of actuators and at least one speaker among the plurality of speakers are mutually associated in each set of a plurality of sets of the plurality of actuators and the plurality of speakers;
and
a control circuit configured to control an operation of the sensation induction device based on a control signal from an external device, such that a first output signal from the at least one actuator overlaps a second output signal from the at least one speaker in a determined frequency band, wherein
the first output signal of the at least one actuator and the second output signal of the at least one speaker are interlocked for each set of the plurality of sets, and
an amplitude of at least one of the first output signal or the second output signal is attenuated in the determined frequency band based on an output ratio between the first output signal and the second output signal.

17. A control device, comprising:
circuitry configured to:
generate a control signal to control an operation of a sensation induction device, wherein the sensation induction device includes:
a plurality of actuators; and
a plurality of speakers, wherein
at least one actuator among the plurality of actuators and at least one speaker among the plurality of speakers are mutually associated in each set of a plurality of sets of the plurality of actuators and the plurality of speakers,
a first output signal from the at least one actuator overlaps a second output signal from the at least one speaker in a determined frequency band, such that the first output signal of the at least one actuator and the second output signal of the at least one speaker are interlocked for each set of the plurality of sets, and
an amplitude of at least one of the first output signal or the second output signal is attenuated in the determined frequency band based on an output ratio between the first output signal and the second output signal; and
output the control signal to the sensation induction device.

18. A sensation induction method, comprising:
outputting a control signal for controlling an operation of a sensation induction device, wherein the sensation induction device includes:
a plurality of actuators; and
a plurality of speakers, wherein
at least one actuator among the plurality of actuators and at least one speaker among the plurality of speakers are mutually associated in each set of a plurality of sets of the plurality of actuators and the plurality of speakers; and controlling the operation based on the control signal such that a first output signal from the at least one actuator overlaps a second output signal from the at least one speaker in a determined frequency band, wherein the first output signal of the at least one actuator and the second output signal of the at least one speaker are interlocked for each set of the plurality of sets, and an amplitude of at least one of the first output signal or the second output signal is attenuated in the determined frequency band based on an output ratio between the first output signal and the second output signal.

* * * * *